(12) United States Patent
Roup et al.

(10) Patent No.: US 11,318,713 B2
(45) Date of Patent: *May 3, 2022

(54) GARMENTS WITH ABSORBENT, WICKING, AND EXPANDABLE BANDROLLS

(71) Applicant: Talon Technologies, Inc., Woodland Hills, CA (US)

(72) Inventors: Herman Sydney Roup, Santa Barbara, CA (US); Thomas Bennett Nields, Venice, CA (US)

(73) Assignee: Talon Technologies, Inc., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,994

(22) Filed: Jun. 5, 2021

(65) Prior Publication Data

US 2021/0362466 A1  Nov. 25, 2021

Related U.S. Application Data

(63) Continuation of application No. PCT/IB2019/059858, filed on Nov. 16, 2019, which
(Continued)

(51) Int. Cl.
*B32B 5/26* (2006.01)
*B32B 5/02* (2006.01)
(Continued)

(52) U.S. Cl.
CPC ............... *B32B 5/26* (2013.01); *A41D 1/06* (2013.01); *A41D 1/14* (2013.01); *A41D 27/00* (2013.01);
(Continued)

(58) Field of Classification Search
CPC .. B32B 5/26; B32B 5/024; A41D 1/06; A41D 20/00
See application file for complete search history.

(56) References Cited

U.S. PATENT DOCUMENTS 1,462,279 A  7/1923  Guinzburg
1,741,866 A  12/1929  Mann
(Continued)

FOREIGN PATENT DOCUMENTS

JP  H06166901 A  6/1994
JP  H0782640 A  3/1995
(Continued)

OTHER PUBLICATIONS

WIPO, International Search Report received in International Application No. PCT/IB2019/059858, dated Jun. 11, 2020, (3p.).
(Continued)

*Primary Examiner* — Tajash D Patel
(74) *Attorney, Agent, or Firm* — Siritzky Law, PLLC

(57) ABSTRACT

A garment includes a bandroll for a waistband of the garment, the bandroll having an absorption layer and a wicking layer. The wicking layer controls stretch properties of the absorption layer. The waistband comprises a second material and wherein a shrinkage of a material substrate of the bandroll substantially matches a shrinkage of the second material. The bandroll provides memory to the waistband. The garments may be pants, shorts, overalls, skirts, dresses, jumpers, and one-piece suits, and may be a uniform.

26 Claims, 11 Drawing Sheets

Related U.S. Application Data is a continuation of application No. 16/574,749, filed on Sep. 18, 2019, now Pat. No. 10,828,864.

(60) Provisional application No. 62/775,841, filed on Dec. 5, 2018.

(51) Int. Cl.
*B32B 3/26* (2006.01)
*A41D 1/14* (2006.01)
*A41D 1/06* (2006.01)
*A41D 27/00* (2006.01)

(52) U.S. Cl.
CPC .............. *B32B 3/266* (2013.01); *B32B 5/024* (2013.01); *B32B 5/026* (2013.01); *A41D 2300/22* (2013.01); *A41D 2500/50* (2013.01); *B32B 2250/20* (2013.01); *B32B 2262/0276* (2013.01); *B32B 2262/062* (2013.01); *B32B 2262/065* (2013.01); *B32B 2307/51* (2013.01); *B32B 2307/724* (2013.01); *B32B 2307/726* (2013.01); *B32B 2437/00* (2013.01)

(56) References Cited

U.S. PATENT DOCUMENTS

| | | | |
|---|---|---|---|
| 1,776,975 A | 9/1930 | Levy | |
| 1,836,742 A | 12/1931 | Auerbach | |
| 1,963,004 A | 6/1934 | Tucker | |
| 2,021,975 A | 11/1935 | Wrigley et al. | |
| 2,024,007 A | 12/1935 | McColloch et al. | |
| 2,025,485 A | 12/1935 | Tucker | |
| 2,033,680 A | 3/1936 | Campbell | |
| 2,034,421 A | 3/1936 | Rowe et al. | |
| 2,087,532 A | 7/1937 | Shepard | |
| 2,101,380 A | 12/1937 | Alston | |
| 2,106,334 A | 1/1938 | Adamson | |
| 2,319,809 A | 5/1943 | Francis, Jr. | |
| 2,335,313 A | 11/1943 | Rowe et al. | |
| 2,343,614 A | 3/1944 | Harpham | |
| 2,495,187 A | 1/1950 | Shames | |
| 2,573,773 A | 11/1951 | Rowe | |
| 2,825,117 A | 3/1958 | Evans et al. | |
| 2,890,515 A | 6/1959 | Parker et al. | |
| 2,996,723 A | 8/1961 | Ainslie | |
| 3,001,262 A | 9/1961 | Parker et al. | |
| 3,382,552 A | 5/1968 | Davis et al. | |
| 3,382,553 A | 5/1968 | Davis et al. | |
| 3,438,842 A | 4/1969 | Petterson et al. | |
| 3,478,366 A | 11/1969 | Kaufman | |
| 3,504,712 A | 4/1970 | Dusenbury et al. | |
| 3,538,563 A | 11/1970 | Tsuruta et al. | |
| 3,562,817 A | 2/1971 | Huddelston | |
| 3,570,085 A | 3/1971 | Heinemann | |
| 3,638,242 A | 2/1972 | Herter | |
| 3,655,474 A | 4/1972 | Constantine | |
| 3,723,217 A | 3/1973 | Bauer | |
| 3,723,993 A | 4/1973 | Ruby | |
| 3,745,588 A | 7/1973 | Pehle | |
| 3,813,698 A | 6/1974 | Campbell et al. | |
| 3,867,248 A | 2/1975 | Bauer | |
| 3,869,728 A | 3/1975 | Spencer | |
| 4,007,835 A | 2/1977 | Klothe | |
| 4,051,215 A | 9/1977 | Tsuruta et al. | |
| 4,244,199 A | 1/1981 | Rhode | |
| 4,332,034 A | 6/1982 | Muse | |
| 4,333,980 A | 6/1982 | Russell | |
| 4,585,510 A | 4/1986 | Hadjiskakis et al. | |
| 4,670,908 A | 6/1987 | Albert | |
| 4,720,874 A | 1/1988 | Crawford | |
| 4,739,718 A | 4/1988 | Effinger et al. | |
| 4,969,243 A | 11/1990 | Strahm | |
| 4,970,728 A | 11/1990 | D'Ambrosio | |
| 5,072,677 A | 12/1991 | Easom et al. | |
| 5,168,581 A | 12/1992 | Garcia et al. | |
| 5,210,882 A | 5/1993 | Moretz et al. | |
| 5,297,296 A | 3/1994 | Moretz et al. | |
| 5,375,266 A | 12/1994 | Crisco | |
| 5,398,346 A | 3/1995 | Feinberg et al. | |
| 5,483,702 A | 1/1996 | D'Ambrosio | |
| 5,675,842 A | 10/1997 | Schaefer | |
| 5,987,721 A | 11/1999 | Morris | |
| 6,566,285 B1 | 5/2003 | Morris et al. | |
| 6,732,413 B1 | 5/2004 | Morris | |
| 6,918,140 B1 | 7/2005 | Cooper | |
| 7,213,271 B1 | 5/2007 | Bielefeld | |
| 7,331,301 B2 | 2/2008 | Morris | |
| 7,367,094 B2 | 5/2008 | Morris | |
| 7,506,597 B2 | 3/2009 | Morris | |
| 8,528,492 B2 | 9/2013 | Morris | |
| 8,661,567 B1* | 3/2014 | Hoover | A41D 20/00 2/170 |
| 8,769,716 B2 | 7/2014 | Luscher | |
| 9,066,549 B2 | 6/2015 | Morris | |
| 9,290,349 B2 | 3/2016 | Morris | |
| 9,756,879 B2 | 9/2017 | Roup | |
| 9,840,037 B2 | 12/2017 | Roup | |
| 9,872,522 B2 | 1/2018 | Roup | |
| 10,220,601 B2 | 3/2019 | Roup et al. | |
| 10,464,252 B2 | 11/2019 | Roup | |
| 10,828,864 B2 | 11/2020 | Roup et al. | |
| 2002/0092084 A1 | 7/2002 | Takayama | |
| 2004/0019955 A1 | 2/2004 | Morris et al. | |
| 2005/0087112 A1 | 4/2005 | Morris | |
| 2008/0264335 A1 | 10/2008 | Roup | |
| 2008/0268157 A1 | 10/2008 | Roup | |
| 2009/0055998 A1 | 3/2009 | Blumenfeld | |
| 2009/0100559 A1 | 4/2009 | Christian | |
| 2009/0133446 A1 | 5/2009 | Burrow | |
| 2010/0101001 A1 | 4/2010 | Morris | |
| 2012/0291177 A1 | 11/2012 | Luscher | |
| 2014/0039432 A1 | 2/2014 | Dunbar et al. | |
| 2014/0196196 A1* | 7/2014 | Lee | A41F 7/00 2/400 |
| 2015/0113697 A1 | 4/2015 | Roup | |
| 2016/0255897 A1 | 9/2016 | Johnson | |
| 2018/0110275 A1 | 4/2018 | Moffa et al. | |
| 2019/0216149 A1* | 7/2019 | Diaz | A41D 27/08 |
| 2019/0274895 A1 | 9/2019 | Chen et al. | |
| 2021/0274856 A1* | 9/2021 | Blythe | A41D 20/005 |

FOREIGN PATENT DOCUMENTS

| | | |
|---|---|---|
| JP | H09273007 A | 10/1997 |
| WO | 2009029709 A1 | 3/2009 |
| WO | 2014022832 A1 | 2/2014 |
| WO | 2019175697 A1 | 9/2019 |
| WO | 2019211692 A1 | 11/2019 |
| WO | 2019211693 A1 | 11/2019 |
| WO | 2019224654 A1 | 11/2019 |

OTHER PUBLICATIONS

WIPO, International Written Opinion received in International Application No. PCT/IB2019/059858, dated Jun. 11, 2020, (6p.).

USPTO, Office Action received in U.S. Appl. No. 16/574,749, filed May 4, 2020, (8p.).

USPTO, Office Action received in U.S. Appl. No. 16/574,749, filed Nov. 14, 2019, (8p.).

USPTO, Office Action received in U.S. Appl. No. 17/093,604, filed Jan. 28, 2021, (5p.).

Japan Patent Office, Non-Final Notice of Reasons for Rejection for JP 2021-531668, dated Jan. 25, 2022 (with machine translation).

Japan Patent Office, Non-Final Notice of Reasons for Rejection for JP 2021-531668, dated Jan. 25, 2022 (human translation).

USPTO, Non-Final Rejection, including Notice of References Cited (Form 892), dated Feb. 16, 2022 for U.S. Appl. No. 17/347,795 [9 pgs.].

* cited by examiner

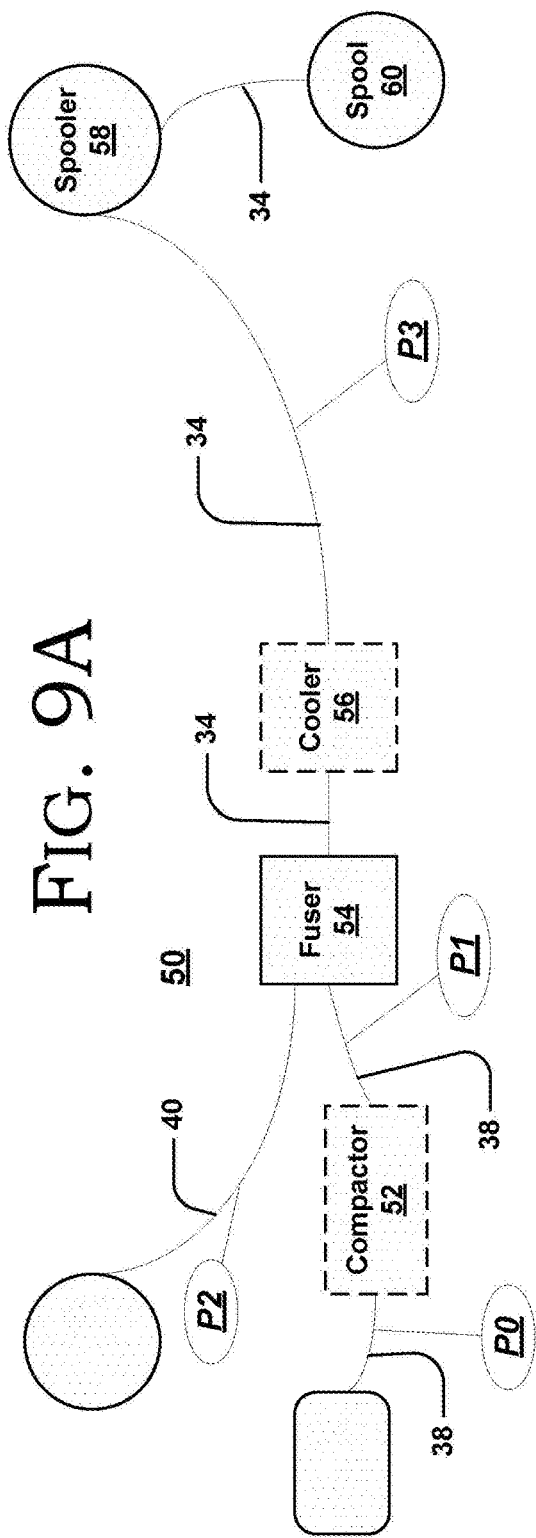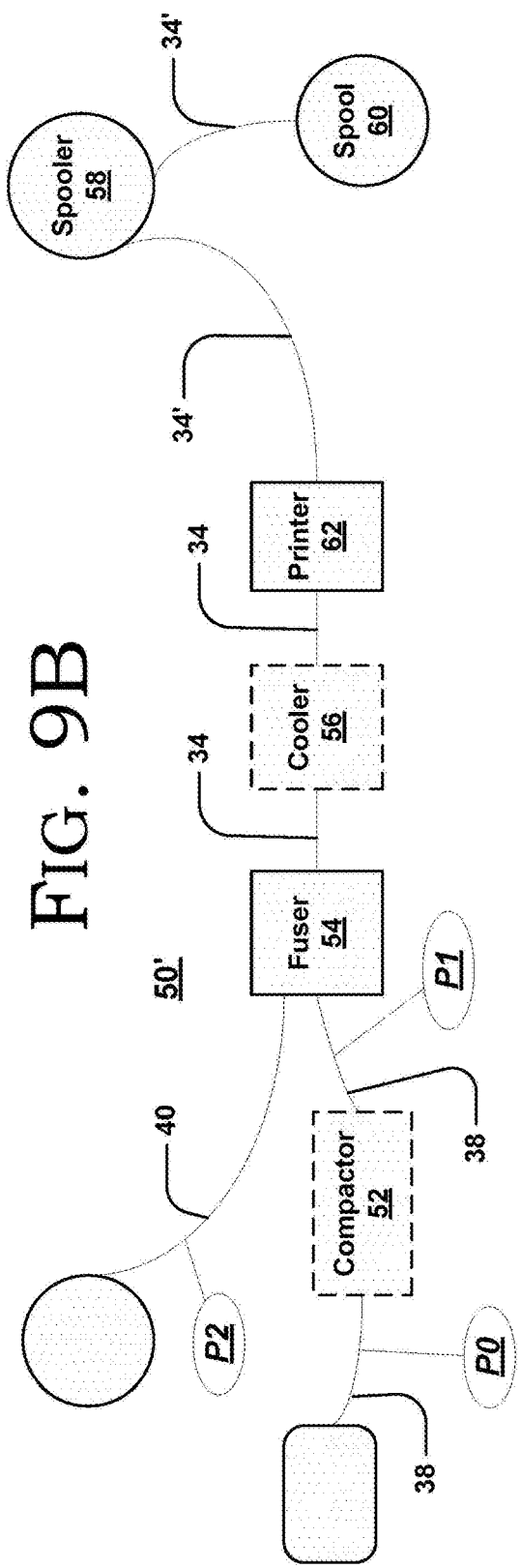

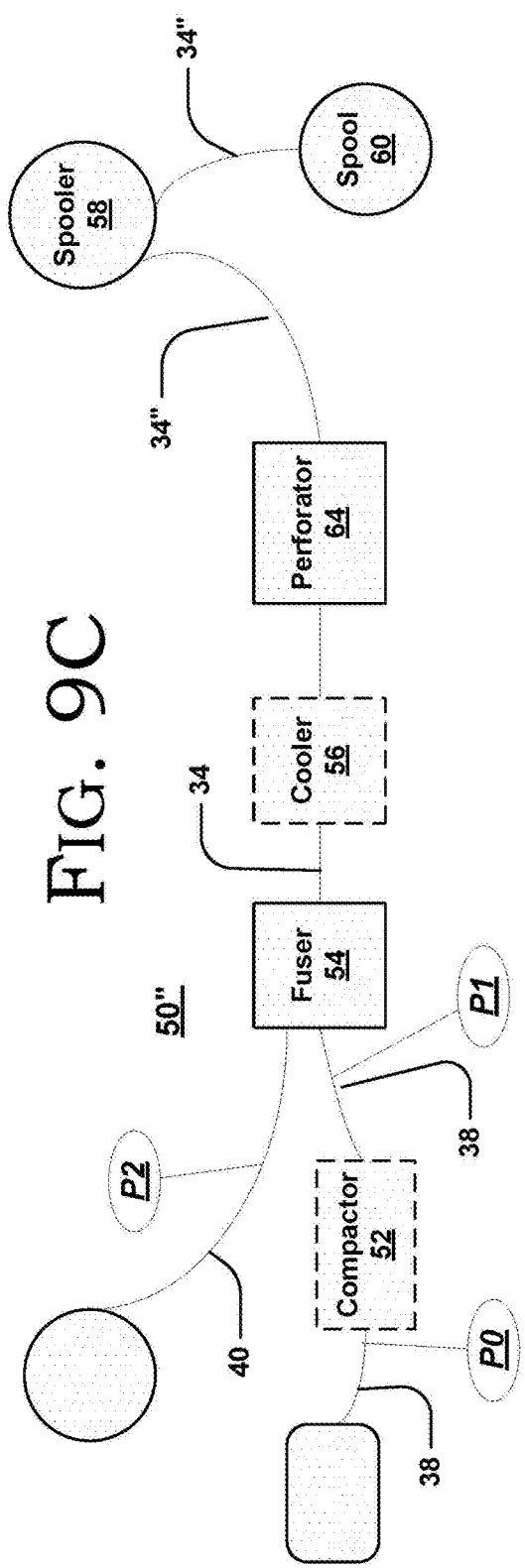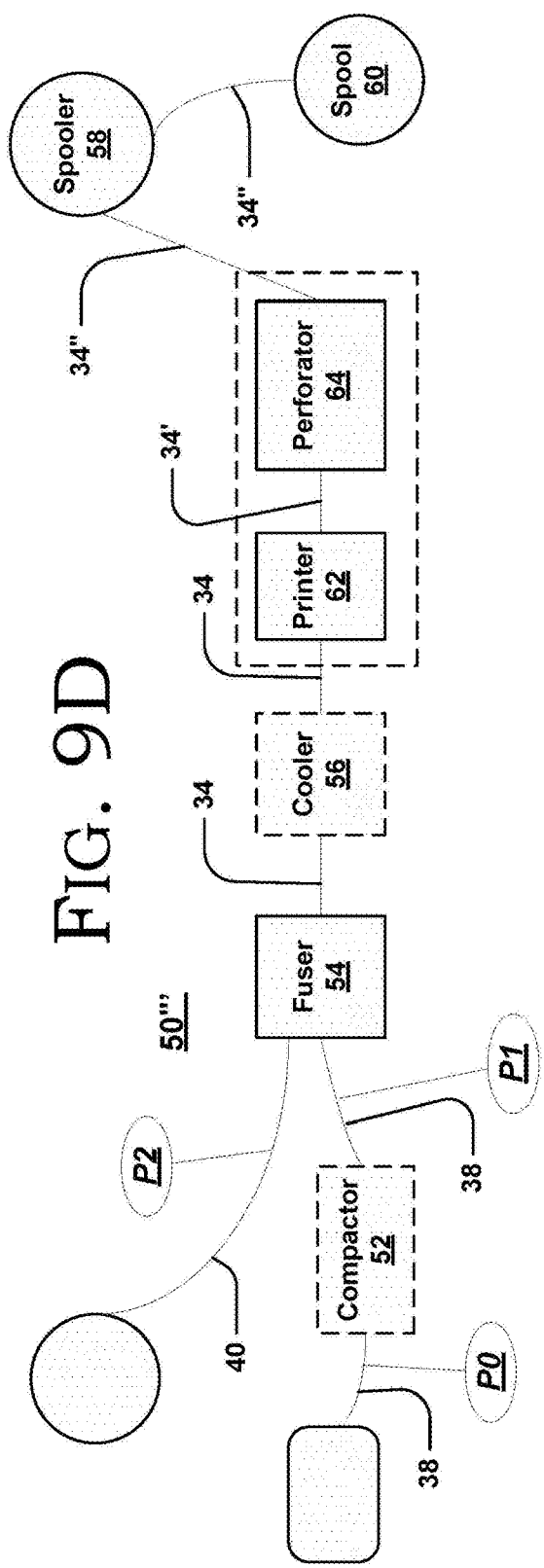

GARMENTS WITH ABSORBENT, WICKING, AND EXPANDABLE BANDROLLS

RELATED APPLICATIONS

This application is a continuation of PCT/IB2019/059858, filed Nov. 16, 2019, which claims priority from (i) U.S. Patent application No. 62/775,841, filed Dec. 5, 2018, and (ii) U.S. patent application Ser. No. 16/574,749, filed Sep. 18, 2019. U.S. patent application Ser. No. 16/574,749 issued as U.S. Pat. No. 10,828,864 B2 on Nov. 10, 2020. U.S. patent application Ser. No. 16/574,749 claims the benefit of U.S. Patent application No. 62/775,841, filed Dec. 5, 2018. The entire contents of each of the following are all hereby fully incorporated herein by reference for all purposes: (i) PCT/IB2019/059858, (ii) U.S. patent application Ser. No. 16/574,749, and (iii) U.S. Patent application No. 62/775,841.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates garments and garment manufacture. More particularly, this invention relates to expandable bandrolls having absorption and wicking properties, and waistbands and garments with same.

BACKGROUND

Some garments have an added inner waistband or curtain made from or with elastic to try to help their performance. Over time, these inner waistbands may stretch out and become misshapen. This may be a result of the wearer's body temperature. The elastic was added to make the garments more comfortable, to avoid excessive stretching, and to provide some recovery from stretching out and deformation of the garments' waistbands.

Elastic waistbands include rubber, and over time, as the waistbands are used, the rubber within the elastic may lose its recovery properties, begin to loosen and eventually break down completely. Laundering (e.g., washing and drying with heat) may accelerate the breakdown of the rubber and thereby of the elastic.

In addition, elastic waistbands tend to trap body heat, causing the wearer to become hot and uncomfortable.

Furthermore, elastic has poor (if any) absorption properties, and as such, moisture (e.g., perspiration) in the wearer's waist area may not be adequately absorbed, causing further discomfort.

Further, even if combined with some absorption, an elastic waistband (or a waistband having an elastic portion against the wearer's body) will not wick moisture away from the wearer.

It is desirable and an object hereof to provide garments with a waistband that expands around the waist, as needed to improve comfort, while keeping its shape, and for waistband to return to its original length and size after expansion.

It is further desirable and an object hereof to provide an expandable waistband that has beneficial absorption and wicking properties.

It is further desirable and an object hereof to provide an expandable waistband that is breathable to allow heat to escape.

SUMMARY

The present invention is specified in the claims as well as in the below description.

These features along with additional details of the invention are described further in the examples herein, which are intended further to illustrate the invention but are not intended to limit its scope in any way.

One general aspect includes a bandroll for a waistband for a garment, the bandroll including: an absorption layer and a wicking layer.

Implementations may include one or more of the following features, alone or in combination(s):

The bandroll where the wicking layer includes a fusible substrate.

The bandroll where the fusible substrate includes a wicking fusible substrate.

The bandroll where the fusible substrate includes a two-way stretch fusible substrate.

The bandroll where the wicking layer includes wicking fibers.

The bandroll where the wicking fibers include polyester fibers.

The bandroll where the wicking layer provides memory to the bandroll.

The bandroll where absorption layer includes a material substrate having absorptive fibers.

The bandroll where the absorptive fibers include one or more of: cotton fibers and/or hemp fibers and/or bamboo fibers.

The bandroll where stretch properties of the absorption layer are due, at least in part, to the material substrate being compacted.

The bandroll where at least some of the material substrate is cut on a bias thereof.

The bandroll where at least some of the material substrate has stretch by mechanical stretch and/or comprises an elastic polyurethane fiber or fabric (e.g., elastane—Lycra).

The bandroll where stretch properties of the absorption layer are due, at least in part, from the material substrate being cut on a bias thereof.

The bandroll where the absorption layer comprises cotton, preferably 100% cotton, or, less preferably, about 90% to 50% cotton.

The bandroll where the absorption layer includes a mix of cotton and polyester.

The bandroll where the absorption layer includes about 65% cotton and 35% polyester, or, less preferably about a 60/40 cotton/polyester ratio or, less preferably about a 50/50 cotton/polyester ratio.

The bandroll where the absorption layer includes a material substrate was compacted prior to being combined with the wicking layer.

The bandroll where the absorption layer has stretch properties, and where said wicking layer controls said stretch properties of said absorption layer.

The bandroll where absorption layer includes a material selected from a group including: cotton, poly-cotton, a compacted woven material, and a compacted knit material.

The bandroll where at least a portion of the absorption layer is perforated.

The bandroll where at least a portion of the absorption layer is uniformly perforated.

The bandroll where the absorption layer is uniformly perforated along a length thereof.

The bandroll where different portions of the absorption layer have different degrees of perforation.

The bandroll where at least a portion of the wicking layer is perforated.

The bandroll where at least a portion of the wicking layer is uniformly perforated.

The bandroll where the wicking layer is uniformly perforated along a length thereof.

The bandroll where at different portions of the wicking layer have different degrees of perforation.

The bandroll where at least a portion of the bandroll is perforated.

The bandroll where the bandroll is uniformly perforated along a length thereof.

The bandroll where different portions of the bandroll have different degrees of perforation.

The bandroll where the absorption layer combined with the wicking layer is fused with the wicking layer.

Another general aspect includes a bandroll for a waistband for a garment, the bandroll including: a material substrate fused with a fusible substrate, where the fusible substrate has wicking properties, and where the material substrate has absorption properties.

Implementations may include one or more of the following features, alone or in combination(s):

The bandroll where the fusible substrate includes a wicking fusible substrate.

The bandroll where the material substrate includes absorptive fibers.

The bandroll where the absorptive fibers include one or more of: cotton fibers and/or hemp fibers and/or bamboo fibers.

The bandroll where the fusible substrate includes wicking fibers.

The bandroll where the wicking fibers include polyester fibers.

The bandroll where the material substrate comprises cotton, preferably 100% cotton, or, less preferably, about 90% to 50% cotton.

The bandroll where the material substrate includes a mix of cotton and polyester.

The bandroll where the material substrate includes about 65% cotton and 35% polyester or, less preferably about a 60/40 cotton/polyester ratio or, less preferably about a 50/50 cotton/polyester ratio.

The bandroll where the material substrate was compacted prior to being fused with the fusible substrate.

The bandroll where the material substrate has stretch properties, and where said fusible substrate controls said stretch properties of said material substrate.

The bandroll where the material substrate includes a fabric, and where stretch properties of the material substrate are due, at least in part, to the fabric being compacted.

The bandroll where the material substrate includes a fabric, and where at least some of the fabric is cut on a bias thereof.

The bandroll where the material substrate includes a fabric, and where stretch properties of the material substrate are due, at least in part, from the fabric being cut on a bias thereof.

The bandroll where the material substrate includes a fabric, and the fabric has stretch by mechanical stretch or comprises an elastic polyurethane fiber or fabric (e.g., elastane—Lycra).

The bandroll where the material substrate is selected from a group including: cotton, poly-cotton, a compacted woven material, and a compacted knit material.

The bandroll where the fusible substrate includes a two-way stretch fusible substrate.

The bandroll where the fusible substrate provides memory and/or performance to the bandroll.

The bandroll where at least a portion of the material substrate is perforated.

The bandroll where at least a portion of the material substrate is uniformly perforated.

The bandroll where the material substrate is uniformly perforated along a length thereof.

The bandroll where different portions of the material substrate have different degrees of perforation.

The bandroll where at least a portion of the fusible substrate is perforated.

The bandroll where at least a portion of the fusible substrate is uniformly perforated.

The bandroll where the fusible substrate is uniformly perforated along a length thereof.

The bandroll where at different portions of the fusible substrate have different degrees of perforation.

The bandroll where at least a portion of the bandroll is perforated.

The bandroll where the bandroll is uniformly perforated along a length thereof.

The bandroll where different portions of the bandroll have different degrees of perforation.

The bandroll where the perforations form and/or comprise one or more repeating patterns.

The bandroll where the perforations form and/or comprise one or more repeating logos and/or text.

The bandroll where the waistband is a straight waistband.

The bandroll where the waistband is a curved waistband.

The bandroll where the waistband includes a second material and where a shrinkage of the material substrate substantially matches a shrinkage of the second material.

The bandroll where the material substrate is compacted an amount generally equal to a shrinkage of the material substrate minus a shrinkage of the second material.

The bandroll where the shrinkage of the material substrate is in the range about 2% to about 15%, and the shrinkage of the second material is the range about 2% to about 15%.

The bandroll where the fusible substrate has shrinkage equal to shrinkage of the second material.

The bandroll where the garment is selected from a group including: pants, shorts, overalls, and skirts.

Another general aspect includes a waistband including a bandroll according the aspects noted above. Implementations of this waistband aspect may include one or more of the following features, alone or in combination(s):

The waistband where the waistband includes a second material and where the material substrate and the second material have substantially the same shape and size.

The waistband where the second material includes an outer layer of the waistband and the bandroll includes an inner layer of the waistband.

The waistband where the bandroll provides memory to the waistband.

The waistband where the bandroll provides wicking and absorption.

The waistband where the waistband is a curved waistband.

The waistband where the waistband is a straight waistband.

Another general aspect includes the garment of any one of the preceding waistband aspects. Implementations may include one or more of the following features, alone or in combination(s):

The garment where the second material is selected from a group including: a pant fabric, cotton, poly-cotton, linen, denim, a compacted woven material, and a compacted knit material.

The garment where the second material includes a fabric that is the same as a fabric of the garment.

The garment where the garment is selected from a group comprising: pants, shorts, overalls, and skirts.

Another general aspect includes a method of making a bandroll any one of the preceding bandroll claims.

Implementations may include one or more of the following features, alone or in combination(s):

The method including: (a) positioning a fusible substrate on a material substrate.

The method may also include (b) fusing said fusible substrate and said material substrate to form a fused combination.

The method may also include (c) spooling said fused combination as a spool of bandrolls.

The method further including: compacting said material substrate prior to said positioning in (a).

The method further including: perforating said fusible substrate and/or said material substrate prior to said positioning in (a).

The method further including: printing indicia on said fused combination.

The method where said printing is performed before perforating said fused combination.

The method where said printing is performed in conjunction with perforating said fused combination.

The method further including: perforating at least a portion of said fused combination.

The method where the fused combination is uniformly perforated.

The method where different portions of the fused combination have different degrees and/or amounts of perforation.

The method where the perforations form and/or comprise one or more repeating patterns.

The method where the perforations form and/or comprise one or more repeating logos and/or text.

Another general aspect includes a bandroll formed by the method of any one of the preceding method aspects.

Another general aspect includes a spool of bandrolls formed by the method of any one of the preceding method aspects.

Below is a list of bandroll embodiments. Those will be indicated with a letter "G". Whenever such embodiments are referred to, this will be done by referring to "G" embodiments.

B1. A bandroll for a waistband for a garment, the bandroll comprising: an absorption layer and a wicking layer.

B2. The bandroll of any one of the preceding embodiments, wherein the wicking layer comprises a fusible substrate.

B3. The bandroll of embodiment B2, wherein the fusible substrate comprises a wicking fusible substrate.

B4. The bandroll of embodiments B2 or B3, wherein the fusible substrate comprises a two-way stretch fusible substrate.

B5. The bandroll of any one of the preceding embodiments, wherein the wicking layer comprises wicking fibers.

B6. The bandroll of embodiment B5, wherein the wicking fibers comprise polyester fibers.

B7. The bandroll of any one of the preceding embodiments, wherein the wicking layer provides memory to the bandroll.

B8. The bandroll of any one of the preceding embodiments, wherein absorption layer comprises a material substrate having absorptive fibers.

B9. The bandroll of embodiment B8, wherein the absorptive fibers comprise one or more of: cotton fibers and/or hemp fibers and/or bamboo fibers.

B10. The bandroll of embodiments B8 or B9, wherein stretch properties of the absorption layer are due, at least in part, to the material substrate being compacted.

B11. The bandroll of any one of embodiments B8-B10, wherein at least some of the material substrate is cut on a bias thereof.

B12. The bandroll of embodiment B11, wherein stretch properties of the absorption layer are due, at least in part, from the material substrate being cut on a bias thereof.

B13. The bandroll of any one of the preceding embodiments, wherein the absorption layer comprises a mix of cotton and polyester.

B14. The bandroll of embodiment B13, wherein the absorption layer comprises cotton, preferably 10% cotton, or, less preferably, about 90% to 50% cotton, or about 65% cotton and about 35% polyester, or, less preferably, about 60% cotton and about 40% polyester, or, less preferably, about 50% cotton and about 50% polyester.

B15. The bandroll of any one of the preceding embodiments, wherein the absorption layer comprises a material substrate was compacted prior to being combined with the wicking layer.

B16. The bandroll of any one of the preceding embodiments, wherein the absorption layer has stretch properties, and wherein said wicking layer controls said stretch properties of said absorption layer.

B17. The bandroll of any one of the preceding embodiments, wherein absorption layer comprises a material selected from a group comprising: cotton, poly-cotton, a compacted woven material, and a compacted knit material.

B18. The bandroll of any one of the preceding embodiments, wherein at least a portion of the absorption layer is perforated.

B19. The bandroll of any one of the preceding embodiments, wherein at least a portion of the absorption layer is uniformly perforated.

B20. The bandroll of any one of the preceding embodiments, wherein the absorption layer is uniformly perforated along a length thereof.

B21. The bandroll of any one of the preceding embodiments, wherein different portions of the absorption layer have different degrees of perforation.

B22. The bandroll of any one of the preceding embodiments, wherein at least a portion of the wicking layer is perforated.

B23. The bandroll of any one of the preceding embodiments, wherein at least a portion of the wicking layer is uniformly perforated.

B24. The bandroll of any one of the preceding embodiments, wherein the wicking layer is uniformly perforated along a length thereof.

B25. The bandroll of any one of the preceding embodiments, wherein at different portions of the wicking layer have different degrees of perforation.

B25'. The bandroll of any one of the preceding embodiments, wherein the perforations form and/or comprise one or more repeating patterns.

B25". The bandroll of any one of the preceding embodiments, wherein the perforations form and/or comprise one or more repeating logos and/or text.

B26. The bandroll of any one of the preceding embodiments, wherein at least a portion of the bandroll is perforated.

B27. The bandroll of any one of the preceding embodiments, wherein the bandroll is uniformly perforated along a length thereof.

B28. The bandroll of any one of the preceding embodiments, wherein different portions of the bandroll have different degrees of perforation.

B29. The bandroll of any one of the preceding embodiments, wherein the absorption layer combined with the wicking layer is fused with the wicking layer.

B30. A bandroll for a waistband for a garment, the bandroll comprising: a material substrate fused with a fusible substrate, wherein the fusible substrate has wicking properties, and wherein the material substrates has absorption properties.

B31. The bandroll of embodiment B30, wherein the fusible substrate comprises a wicking fusible substrate.

B32. The bandroll of embodiments B30 or B31 wherein the material substrate comprises absorptive fibers.

B33. The bandroll of embodiment B32 wherein the absorptive fibers comprise one or more of: cotton fibers and/or hemp fibers and/or bamboo fibers.

B34. The bandroll of any one of embodiments B30 to B33, wherein the fusible substrate comprises wicking fibers.

B35. The bandroll of embodiment B34, wherein the wicking fibers comprise polyester fibers.

B36. The bandroll of any one of embodiments B30 to B35, wherein the material substrate comprises cotton or a mix of cotton and polyester.

B37. The bandroll of embodiment B36, wherein the material substrate comprises about 65% cotton and 35% polyester, or, less preferably, about 60% cotton and 40% polyester, or, less preferably, about 50% cotton and 50% polyester.

B38. The bandroll of any one of embodiments B30 to B37, wherein the material substrate was compacted prior to being fused with the fusible substrate.

B39. The bandroll of any one of embodiments B30 to B38, wherein the material substrate has stretch properties, and wherein said fusible substrate controls said stretch properties of said material substrate.

B40. The bandroll of any one of embodiments B30 to B39, wherein the material substrate comprises a fabric, and wherein stretch properties of the material substrate are due, at least in part, to the fabric being compacted.

B41. The bandroll of any one of embodiments B30 to B40, wherein the material substrate comprises a fabric, and wherein at least some of the fabric is cut on a bias thereof.

B42. The bandroll of any one of embodiments B30 to B41, wherein the material substrate comprises a fabric, and wherein stretch properties of the material substrate are due, at least in part, from the fabric being cut on a bias thereof and/or the fabric has mechanical stretch and/or comprises an elastic polyurethane fiber or fabric (e.g., elastane—Lycra).

B43. The bandroll of any one of embodiments B30 to B42, wherein material substrate is selected from a group comprising: cotton, poly-cotton, a compacted woven material, and a compacted knit material.

B44. The bandroll of any one of embodiments B30 to B43, wherein the fusible substrate comprises a two-way stretch fusible substrate.

B45. The bandroll of any one of embodiments B30 to B44, wherein the fusible substrate provides memory to the bandroll.

B46. The bandroll of any one of embodiments B30 to B45, wherein at least a portion of the material substrate is perforated.

B47. The bandroll of any one of embodiments B30 to B46, wherein at least a portion of the material substrate is uniformly perforated.

B48. The bandroll of any one of embodiments B30 to B47, wherein the material substrate is uniformly perforated along a length thereof.

B48'. The bandroll of any one of embodiments B30 to B48, wherein the perforations form and/or comprise one or more repeating patterns.

B48". The bandroll of any one of embodiments B30 to B48', wherein the perforations form and/or comprise one or more repeating logos and/or text.

B49. The bandroll of any one of embodiments B30 to B49, wherein different portions of the material substrate have different degrees of perforation.

B50. The bandroll of any one of embodiments B30 to B49, wherein at least a portion of the fusible substrate is perforated.

B51. The bandroll of any one of embodiments B30 to B50, wherein at least a portion of the fusible substrate is uniformly perforated.

B52. The bandroll of any one of embodiments B30 to B51, wherein the fusible substrate is uniformly perforated along a length thereof.

B53. The bandroll of any one of embodiments B30 to B52, wherein at different portions of the fusible substrate have different degrees of perforation.

B54. The bandroll of any one of embodiments B30 to B53, wherein at least a portion of the bandroll is perforated.

B55. The bandroll of any one of embodiments B30 to B54, wherein the bandroll is uniformly perforated along a length thereof.

B56. The bandroll of any one of embodiments B30 to B55, wherein different portions of the bandroll have different degrees of perforation.

B57. The bandroll of any one of the preceding embodiments, wherein the waistband is a straight waistband.

B58. The bandroll of any one of embodiments B1 to B56, wherein the waistband is a curved waistband.

B59. The bandroll of any one of embodiments B30 to B58, wherein the waistband comprises a second material and wherein a shrinkage of the material substrate substantially matches a shrinkage of the second material.

B60. The bandroll of embodiment B59, wherein the material substrate is compacted an amount generally equal to a shrinkage of the material substrate minus a shrinkage of the second material.

B61. The bandroll of Embodiments B59 or B60, wherein the fusible substrate has shrinkage equal to shrinkage of the second material.

B62. The bandroll of any one of embodiments B59-B61, wherein the shrinkage of the material substrate is in the range about 2% to about 15%, and the shrinkage of the second material is the range about 2% to about 15%.

B63. The bandroll of any one of the preceding embodiments, wherein the garment is selected from a group comprising: pants, pants, shorts, overalls, and skirts.

Below is a list of waistband embodiments. Those will be indicated with a letter "W". Whenever such embodiments are referred to, this will be done by referring to "W" embodiments.

W64. A waistband comprising a bandroll according to any one of the preceding bandroll embodiments.

W65. The waistband of embodiment W64, wherein the waistband comprises a second material and wherein the material substrate and the second material have substantially the same shape and size.

W66. The waistband of waistband embodiment W65 wherein the second material comprises an outer layer of the waistband and the bandroll comprises an inner layer of the waistband.

W67. The waistband of any one of waistband embodiments W64-W66, wherein the bandroll provides memory to the waistband.

W68. The waistband of any one of embodiments W64-W67, wherein the bandroll provides wicking and absorption.

Below is a list of garment embodiments. Those will be indicated with a letter "G". Whenever such embodiments are referred to, this will be done by referring to "G" embodiments.

G69. A garment comprising a waistband according to any one of the preceding waistband embodiments W64-W68.

G70. The garment of embodiment G69, wherein the second material comprises a fabric that is the same as a fabric of the garment.

G71. The garment of any one of the preceding waistband embodiments, wherein the second material is selected from a group comprising: a pant fabric, cotton, poly-cotton, linen, denim, a compacted woven material, and a compacted knit material.

Below is a list of method embodiments. Those will be indicated with a letter "M". Whenever such embodiments are referred to, this will be done by referring to "M" embodiments.

M72. A method of making a bandroll any one of the preceding bandroll embodiments.

M73. The method of embodiment M72, comprising:
(A) positioning a fusible substrate on a material substrate;
(B) fusing said fusible substrate and said material substrate to form a fused combination; and
(C) spooling said fused combination as a spool of bandrolls.

M74. The method of embodiments M72 or M73, further comprising:
compacting said material substrate prior to said positioning in (A).

M75. The method of embodiment M73 or M74, further comprising:
perforating said fusible substrate and/or said material substrate prior to said positioning in (A).

M76. The method of any one of embodiments M73 to M75, further comprising:
perforating at least a portion of said fused combination.

M77. The method of any one of embodiments M73 to M76, wherein the fused combination is uniformly perforated.

M78. The method of any one of embodiments M73 to M76, wherein different portions of the fused combination have different degrees and/or amounts of perforation.

M78' The method of any one of embodiments M73 to M78 wherein the perforations form and/or comprise one or more repeating patterns.

M78" The method of any one of embodiments M73 to M78' wherein the perforations form and/or comprise one or more repeating logos and/or text.

M79. The method of any one of embodiments M75 to M78, further comprising:
printing indicia on said fused combination.

M80. The method of embodiment M79, wherein said printing is performed before perforating said fused combination.

M81. The method of embodiment M79, wherein said printing is performed in conjunction with perforating said fused combination.

Below are Other Embodiments:

B82. A bandroll formed by the method of any one of the preceding method embodiments.

S83. A spool of bandrolls formed by the method of any one of the preceding method embodiments.

The above features along with additional details of the invention are described further in the examples herein, which are intended further to illustrate the invention but are not intended to limit its scope in any way.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 9A-9D depict systems for manufacture of bandrolls according to exemplary embodiments hereof;

DETAILED DESCRIPTION OF THE PRESENTLY PREFERRED EXEMPLARY EMBODIMENTS

In the following description, bandrolls and waistbands are described in connection with pants. Those of ordinary skill in the art will realize and appreciate, upon reading this description, that the bandrolls may be configured and incorporated with other types of garments such as skirts, dresses, jumpers, one-piece suits, etc. As should be appreciated, the scope of the embodiments described herein is not limited in any way by the type of garment with which a bandrolls may be configured.

Figure 1A:
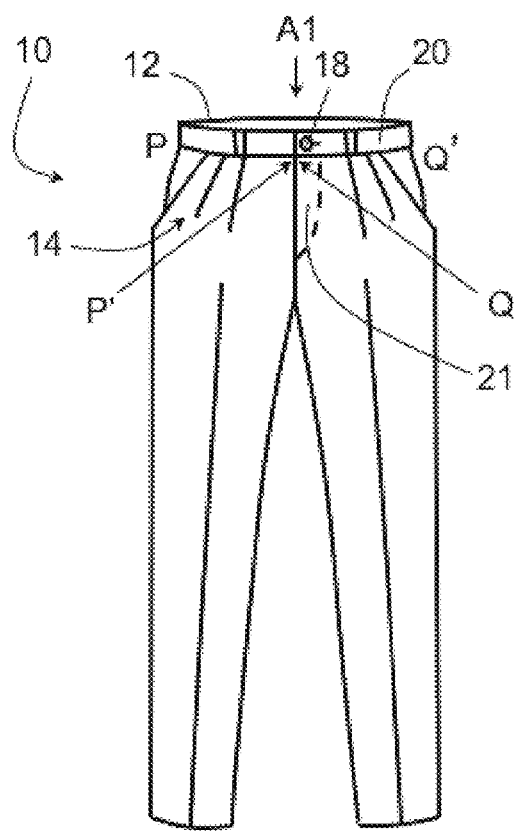
FIGS. 1A-1B show aspects of a garment incorporating a bandroll according to exemplary embodiments hereof.
Figure 1B:
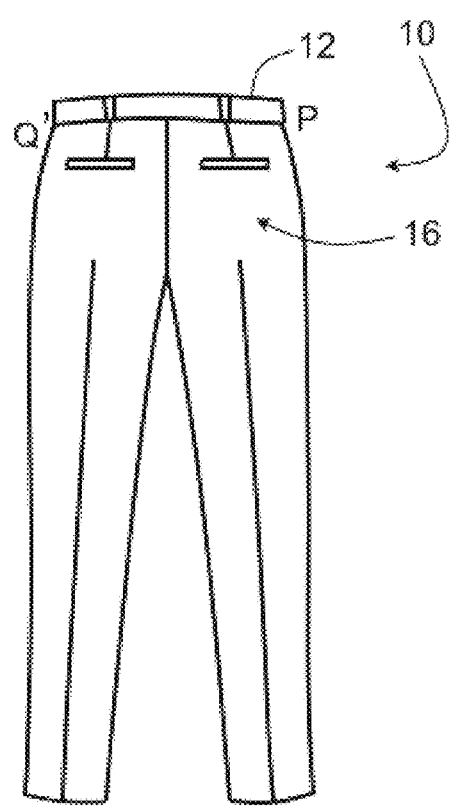

FIGS. 1A and 1B each show a pair of pants 10 having a pant body and incorporating the waistband 12 including a bandroll according to exemplary embodiments hereof. FIG. 1A shows the pants 10 from the front and FIG. 1B shows the pants 10 from the back. The waistband 12 may be attached to the front of pant body 14, e.g., by being sewn along the line P-P' on the left and along the line Q-Q' on the right. The waistband 12 may be attached to the back pant body 16, e.g., by being sewn along the line Q'-P.

The pants 10 may be made with a self-fabric, which may be any general pant fabric, including denim, cotton, polycotton, linen, polyester, etc. The self-fabric may also be rigid material, mechanical stretch material, stretch material (e.g., elastane—Lycra or Spandex) or other types of materials or any combination thereof.

The pants 10 may be any pants, including, without limitation, long pants, short pants, three-quarter pants, capris, mid-calf, or any other type pants.

Note that in any of the embodiments described herein, the elements of the pants 10 (e.g. the waistband 12) may also be attached using attachment methods other than sewing such as fabric welding, adhesives or other attachment methods. In addition, the waistband 12 may be attached with different and/or other attachment methods in different places or parts. For example, the connections along lines P-P' and Q-Q' on the front of the pants 10 (FIG. 1A) may differ from the connections along lines Q'-P in the back of the pants (FIG. 1B). The ends (e.g. ends at P' and Q) of the waistband 12 may also be attached to one another using any of the methods, or combinations of the methods described above. Attachment methods may differ, e.g., in the kind of method (e.g., stitching vs. welding or the like), or in the kind of stitching. The connection of the ends (e.g. ends at P' and Q) may be optional and may or may not include attachment mechanisms 18 as described below.

The waistband 12 and other pieces may have border regions (not shown) that can be used for connecting (e.g., stitching) to adjacent pieces. In general, in the drawings, the waistband 12, waistband pieces, and pant pieces are exemplary in shape and border or stitching regions may not be shown.

Waistbands

Figure 2A:
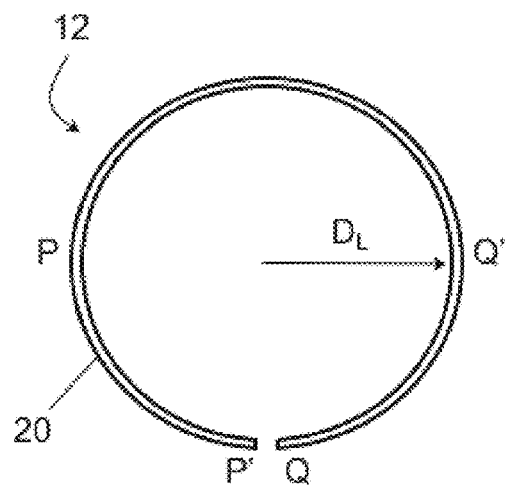
FIGS. 2A-2C show aspects of a garment waistband incorporating a bandroll according to exemplary embodiments hereof
Figure 2B:
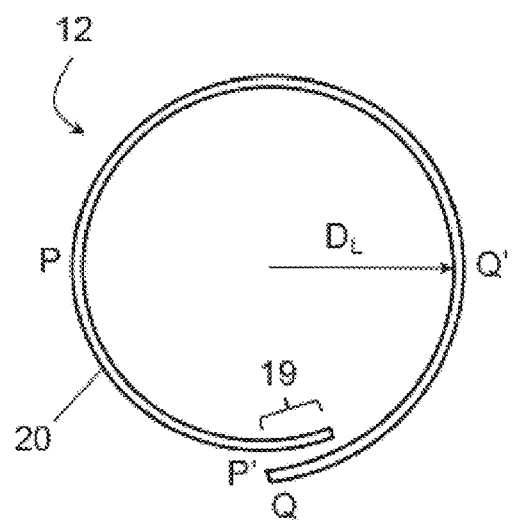

The waistband 12 may be a band that may be formed into a loop. The manner in which the waistband 12 may be formed and the materials that may be used will be described in other sections of this specification. FIGS. 2A-2B show general representations of the waistband 12 of FIG. 1A looking in the direction of arrow A1. In exemplary embodiments hereof, the waistband 12 may be an open loop as shown in FIGS. 1A, 2A, and 2B. That is, the waistband 12 may generally have one end at P' and another end at Q, and the ends at P' and at Q may not be joined together when the pants 10 are not being worn. In this way, the junction at P'-Q may be an open junction that may allow the diameter of the waistband 12 to widen such that the pants 10 may be slipped onto a person's body more easily. It may be preferable for the waistband 12 to include an attachment mechanism 18 that may join the ends at P' and Q (the open junction) when the pants 10 may be worn.

The attachment mechanism 18 may include a button and a buttonhole (as shown in FIG. 1A), male and female components of a snap, hook and loop material, a zipper and/or any other type of attachment mechanism 18 or combinations of attachment mechanisms 18. In some exemplary embodiments (e.g. when using a button and a buttonhole as an attachment mechanism 18), the waistband 12 may include an extended portion 19 on one end (e.g. the end at P') that may overlap the other end (e.g. the end at Q) when the ends may be joined. This is shown in FIG. 2B. Note that the extended portion 19 may be configured with the end at Q instead of the end at P' such that the end at Q may overlap the end at P. Both ends P', Q, and/or any other ends that the waistband 12 may include, may also include an extended portion 19 such that any ends may overlap with any other corresponding ends.

The overlap portion 19 may allow the attachment mechanisms 18 properly to engage. In the example of using a button and a corresponding buttonhole, the overlap portion 19 may include the button and the other end of the waistband (e.g. the end at Q) may include the buttonhole. In this way, the button may generally align and engage with the buttonhole to join the ends P' and Q when the pants 10 may be worn. In some embodiments, the extended portion 19 may be configured with the upper portion of the fly 21 of the pants 10. Note however that the fly 21 may be optional.

Note that FIG. 2B is meant for conceptual illustrative purposes to generally demonstrate an open loop with an overlap portion 19 and does not depict the attachment mechanism(s) 18.

The waistband 12 may or may not include belt loops, brand labels, size labels, decorative elements (e.g. decorative stitching), and/or other elements.

While FIGS. 1A, 2A, and 2B depict the opening (the open junction) of the waistband 12 as generally located in the front of the pants 10 at the junction P'-Q, it is understood that the waistband 12 may include an open junction that may be located anywhere along the length of the waistband 12. The waistband 12 may also include more than one open junction, and the openings may be located in any locations along the length (or circumference) of the waistband 12. For example, the waistband 12 may include an open junction on the left side (e.g. in proximity to P in FIG. 1A) and an open junction on the right side (e.g. in proximity to Q' in FIG. 1A). In this case, the waistband 12 may be formed of more than one piece (e.g. one piece between P and Q' along the front, and one piece between Q' and P along the back). The waistband may or may not include an attachment mechanism 18 at each open junction.

It will be appreciated by a person of ordinary skill in the art, upon reading this specification, that the exemplary embodiments described herein are not limited in any way by the location and/or number of open junctions that the waistband 12 may include, or the type of attachment mechanism(s) 18 that may be used to generally secure the ends of the waistband 12 together at the junction P'-Q, or at any other junction or junctions.

Figure 2C:
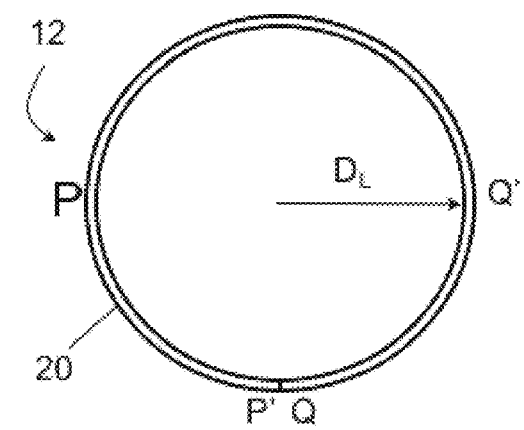

In exemplary embodiments, the waistband 12 may be a closed loop as shown in FIG. 2C. The waistband 12 may be formed of one section or piece, and the ends of the section may be joined together. For example, the waistband 12 may have one end at P' and another end at Q, and the ends at P' and at Q may be sewn or otherwise joined together to form a closed loop. The waistband 12 may also be formed of more than one section or piece, and the ends of each section or piece may be joined together to form the waistband 12.

In other embodiments, the waistband 12 may be a closed loop that may be directly formed as a loop (e.g. on a loom) and may thereby not include any open ends (e.g. may not include an end at P' and an end at Q).

In any event, and in all embodiments described herein, it is appreciated and understood that the waistband 12 may be formed of any number of sections and with any number of ends that may be joined together to generally form the waistband 12, and that the scope of the embodiments described herein is not limited in any way by the number of sections or pieces used to form the waistband 12. In addition, the sections that may form the waistband 12 may be formed of the same or different materials.

Figure 3A:
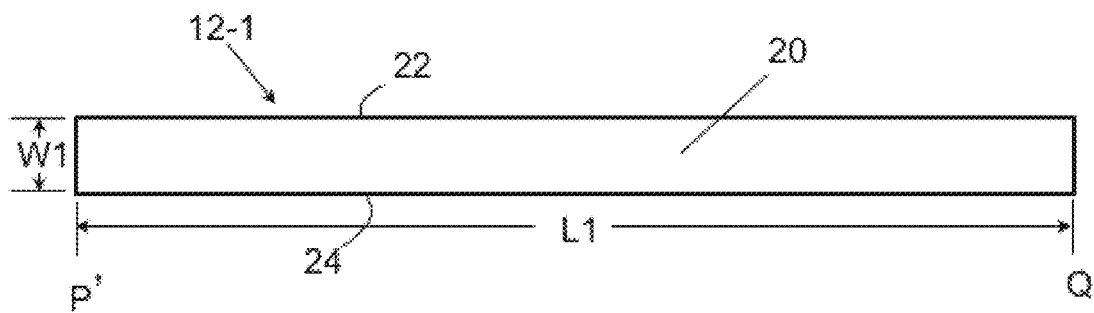
FIGS. 3A-3B show aspects of garment waistbands incorporating a bandroll according to exemplary embodiments hereof.

FIG. 3A shows an exemplary embodiment of the waistband 12 laid out generally flat (not formed into a closed loop or an open loop). For demonstration, the waistband 12 of FIG. 3A may be illustrated as being formed of a single piece or segment with a width W1, a length L1 and an outer facing surface 20, an upper or top edge 22 and a lower edge 24. The waistband 12 may also be formed of multiple sections or pieces that may be joined together to form the waistband 12. In the example shown, the waistband 12 may be generally straight from left (P') to right (Q). The waistband 12 may also include a constant width W1 along its length from left (P') to right (Q) but this may not be required. This waistband 12 may be referred to in the art as a straight waistband 12-1. When the straight waistband 12-1 of FIG. 3A may be formed into a loop (e.g. the open loop of FIGS. 2A and/or 2B or the closed loop of FIG. 2C), the loop may have a constant diameter $D_L$ along its height. This will be described in more detail below with reference to FIG. 4. The length L1 of the waistband 12-1 may generally determine the waist size of the waistband 12 and the pants 10.

Figure 3B:
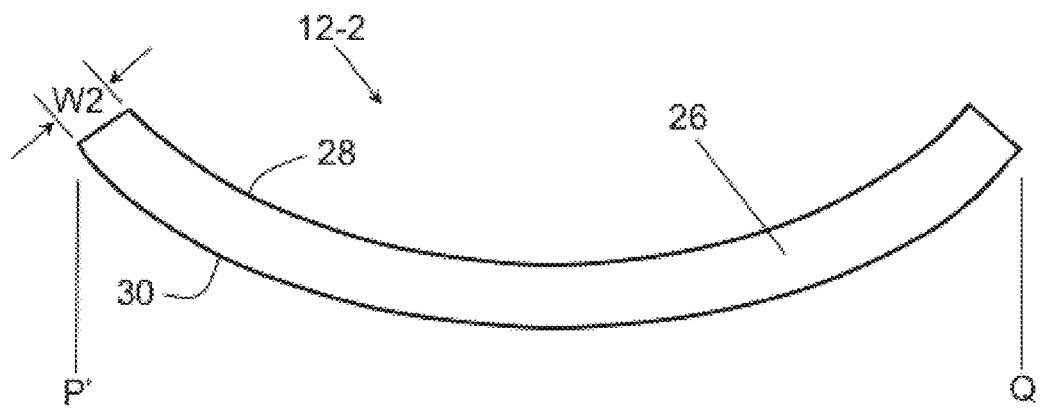

The waistband may be a curved waistband 12-2 (also referred to as a contoured waistband) as shown, e.g., in FIG. 3B which shows an exemplary curved waistband 12-2 laid out generally flat (not formed into a closed loop or an open loop). For conceptual illustrative purposes, the curved waistband 12-2 of FIG. 3B may be illustrated as being formed of a single piece or segment with a width W2, an outer surface 26, a top edge 28, and a lower edge 30. It can be seen that the curved waistband 12-2 may include a curvature (e.g. the upward facing concave curvature of FIG. 3B) from left (P') to right (Q). The curved waistband 12-2 may also be formed of multiple sections or pieces that may be joined together to form the curved waistband 12-2.

Figure 4:
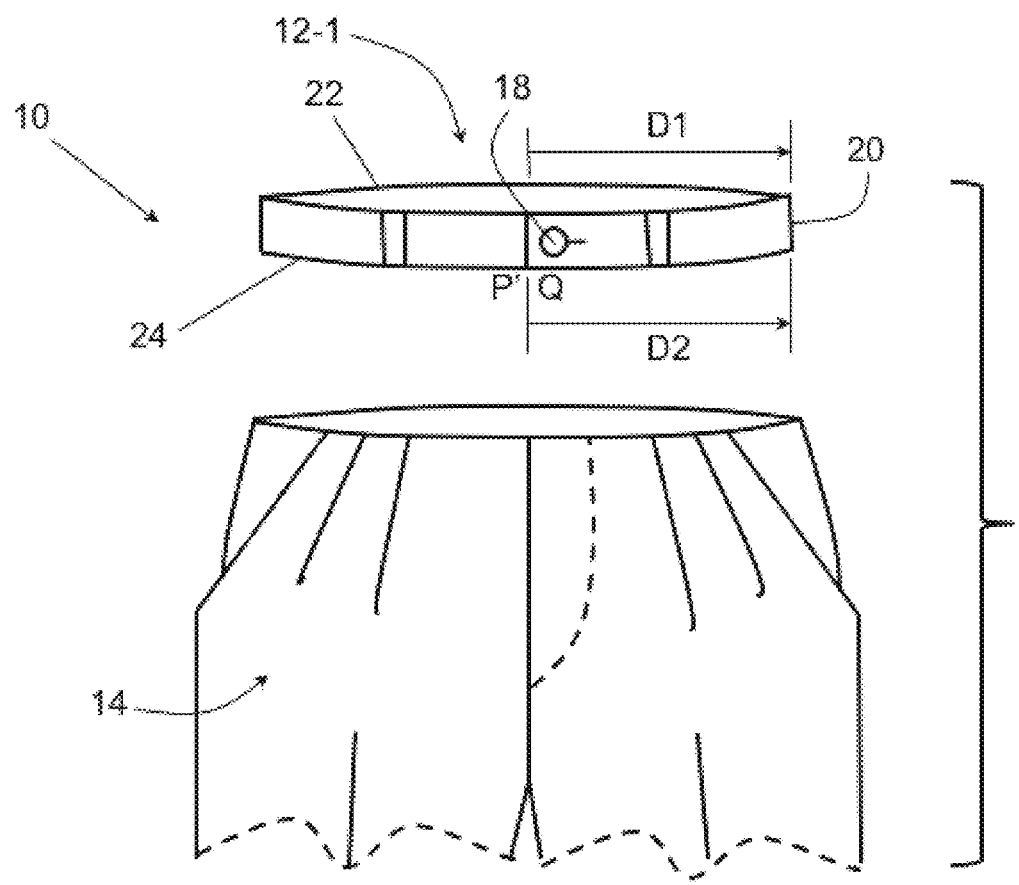
FIG. 4 depicts an exploded view of aspects of the garment of FIGS. 1A-1B.

When the curved waistband 12-2 of FIG. 3B may be formed into a loop (e.g. the open loop of FIGS. 2A and/or 2B or the closed loop of FIG. 2C), the loop may not have a constant diameter $D_L$ along the X-axis FIG. 4 shows an exploded view of the aspects of the pants 10 of FIG. 1A including the waistband 12 of FIGS. 1A and 3A or 3B. The waistband 12 may be a straight waistband 12-1 (from FIG. 3A) or the curved waistband 12-2 (of FIG. 3B). The waistband may be formed into a loop with an outer facing surface 20, a top edge 22, and a lower edge 24. Because the waistband 12 may be a straight waistband 12-1, when the ends at P' and Q are joined (e.g. using an attachment mechanism 18), when formed in a loop, the diameter D1 of the straight waistband 12-1 at the top edge 22 may be equal to the diameter D2 of the straight waistband 12-1 at the lower edge 24. It may be preferable that the diameter D2 may generally match the top diameter of the pant body 14 such that straight waistband 12-1 may be attached thereto. In addition, the outer facing surface 20 of the straight waistband 12-1 may generally extend vertically upward. As known in the art, this resulting waistband 12, with equal diameters D1 and D2 at the upper or top edge 22 and the bottom or lower edge 24, respectively, represent the resulting waistband 12 formed from a straight waistband 12-1.

The waistband 12 may be a curved waistband 12-2 (from FIG. 3B) formed into a loop with an outer surface 26, a top edge 28, and a lower edge 30. Because the waistband 12 may be a curved waistband 12-2, when the ends at P' and Q are joined using an attachment mechanism 18 (or other attachment means), the diameter D3 of the curved waistband 12-2 at the top edge 28 may be less than the diameter D3 of the curved waistband 12-2 at the lower edge 30. In addition, the outer surface 26 of the curved waistband 12-2 may generally slant inward towards the center of the waistband 12-2 as it extends upward. As known in the art, this resulting waistband 12, with unequal equal diameters D3 and D4 at the top edge and the bottom or lower edge 28, 30 respectively, represents the resulting waistband 12 of using a curved waistband 12-2.

It can be seen that the difference between the diameter D3 and the diameter D4 may be proportional to the amount of contour (e.g. generally concave) that the waistband 12-2 may include. That is, a waistband 12-2 with a higher amount of contour may exhibit a greater difference between the diameter D3 and the diameter D4 compared to a waistband 12-2 with a lesser amount of contour.

With the curved waistband 12-2 configured with the pants 10, the curved waistband 12-2 may provide for a contoured fit across the hips and mid-section of the person's body while wearing the pants 10.

In other exemplary embodiments, the waistband 12 formed by the curved waistband 12-2 may be oriented with the larger diameter D4 as the top edge and the smaller diameter D3 as the lower edge. The circumference with the smaller diameter D3 may be joined with the top of the pant body. The outer surface 26 of the curved waistband 12-2 may generally slant outwards away the center of the waistband 12-2 as it extends upward. In this way, the pants 10 may generally include a wider opening at the top of the waistband compared to the opening at the junction between the waistband 12 and the pants 10. This may be preferable for pants 10 and other garments that may have a high waistline.

Note that for purposes of this description, unless specifically stated otherwise, all embodiments, examples, references, descriptions, and details pertaining to the waistband 12 will refer to and be applicable to both a straight waistband 12-1 and a curved waistband 12-2.

In embodiments described herein of the waistbands 12-1 and 12-2 (collectively and individually also referred to as waistband 12), the waistbands 12 may or may not include constant widths (e.g. W1 of FIG. 3A and W2 of FIG. 3B) along their lengths (e.g. L1 of FIG. 3A and the length along the contour of the waistband 12-2 of FIG. 3B). The waistbands 12 may also include widths (e.g. W1 and W2) that may vary along the lengths of the waistbands 12. For example, a waistband 12 may include a width that may be greater on the left side (in the proximity of P) and on the right side (in the proximity of Q') of the waistband 12 compared to the width of the inner region of the waistband 12 between P and Q'. In this example, the waistband 12 may have a larger width in the outer left and right hip regions of the pants 10, when worn. It is understood that this example is meant for illustrative purposes and that the waistband 12 may include any varying width or combinations of varying widths along its length.

The waistbands 12 may also include edges (e.g. upper or top edge 22, lower edge 24 in FIG. 3A, upper or top edge 28, and lower edge 30 in FIG. 3B) that may not have linear or smooth contours, but may instead include different angles, ripples, cutouts, forms, shapes or other elements along the lengths of the waistbands 12. In one example, a waistband 12 may include contours along the upper and lower edges 22, 24 that may represent the shapes of flowers along its length. Other shapes, forms, and combinations of different shapes and forms of waistbands 12 may also be included and are within the scope of these embodiments. It may be preferred that regardless of the shapes, forms, contours, ripples or other elements that the waistband 12 may include along its length, that the waistband 12 may be generally formed into a loop that may be configured with the pants 10 to form a functional waistband 12.

It will be understood by a person of ordinary skill in the art, upon reading this specification, that the waistband 12 may include different curvatures, shapes and forms across all of its dimensions and lines, including but not limited to, the P-P', Q-Q' and Q'-P dimensions and lines, and that the scope of the embodiments described herein are not limited to the curvatures, shapes or forms that the waistband 12 may include. It will also be appreciated by a person of ordinary skill in the art that any or all of the details, elements and characteristics described herein with regards to the waistband 12 are directly applicable to any waistband 12 described in relation to any embodiments herein regardless of the particular shapes, forms, dimensions, positions or configurations of the waistband 12. It will also be appreciated that the waistband 12 of the pants 10 may generally include and/or be configured with any portions of the pants 10 as required by the pant 10 and/or by the exemplary embodiments described herein.

It is also understood that any of the embodiments of the straight waistband 12-1 and/or the curved waistband 12-2 may include some or any combinations of the elements of the straight waistband 12-1 and/or the curved waistband 12-2 as describe herein. For example, a waistband 12 that may include a contour along its length as shown in FIG. 3B may also include a portion of its length that may be straight as shown in FIG. 3A. In another example, both a straight waistband 12-1 and/or a curved waistband 12-2 may or may not include an attachment mechanism 18, or may be formed into a closed loop as shown in FIG. 2C. These examples are for illustrative purposes and it is clear that any and all other combinations of the various elements described herein regarding waistbands 12-1 and waistbands 12-2 may or may not be included in any of the embodiments described herein.

Forming Waistbands

Figure 5:
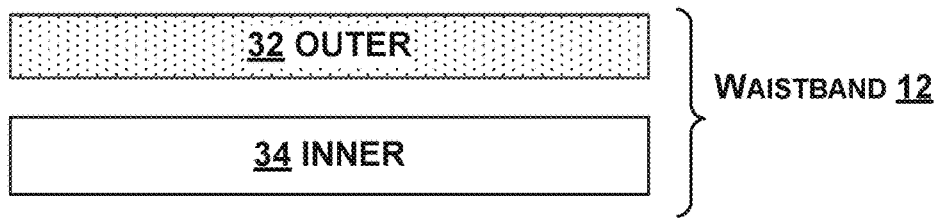
FIGS. 5, 6A-6C, and 7A-7E show aspects of bandrolls and/or of waistbands incorporating bandrolls according to exemplary embodiments hereof.

With reference to FIG. 5, a waistband 12 according to exemplary embodiments hereof, may be formed from an outer piece 32 and an inner piece 34. The inner piece 34 may be referred to herein as a bandroll or flex panel.

The outer piece 32 may be positioned on the outside of the waistband 12 when attached to a garment, when worn, and the inner piece 34 may be positioned on the inside of the waistband 12 when attached to a garment, when worn. The outer and inner pieces 32, 34 may preferably be substantially matching in shape and may be overlaid and combined to form the waistband 12. The waistband 12 may generally encircle the waist when attached to a garment and worn.

As shown in FIG. 5, the waistband 12 may comprise an outer piece 32 and an inner piece 34 that may be overlaid lengthwise and joined together to generally form the waistband 12. The outer piece 32 and the inner piece 34 may be joined by top and bottom stitching (e.g. along their corresponding lengths), stitching in other areas (e.g. in the middle along the length or other areas), using adhesives, fabric welding, grommets or by any other attachment mechanisms or combinations of attachment mechanisms.

The outer piece 32 may preferably comprise a self-fabric (e.g. the same self-fabric as used in the garment to which the waistband will be attached), or another type of material, with at least some of the outer piece 32 preferably having stretch and recovery properties in at least one direction thereof. Further details of the outer piece 32 will be described elsewhere herein.

As discussed in greater detail below (with reference to FIG. 6A) the inner piece 34 may preferably comprise a material substrate or fabric 38 with stretch properties combined with a fusible substrate 40 with stretch and recovery properties. In this way, the inner piece 34 may stretch and recover, where the fusible substrate 40 may provide recovery.

Once combined with the outer piece 32 to form a waistband 12, the bandroll or inner piece 34 may provide stretch and recovery to the outer piece 32 and the waistband 12.

In exemplary embodiments hereof, the waistband 12 may be formed by cutting a length of a single inner piece 34 from a continuous stream of bandrolls or inner pieces 34 (e.g. spooled) and combining the single inner piece 34 with a length of a single outer piece 32. The lengths of the inner piece 34 cut from the spooled continuous stream of inner pieces 34 and the outer piece 32 may be the same or similar to the desired length of the waistband 12 being formed. In this way, the two pieces (outer 32 and inner 34) may be combined to form a waistband 12 of the desired length.

The waistband 12 of FIG. 5 may generally correspond to the waistband 12 described above with reference to FIGS. 1A, 1B, 2A-2C, 3A-3B, and 4. That is, e.g., the waistband 12 shown individually in FIG. 5 may generally include the shape and form of the straight waistband 12-1. For purposes of this description, the process and method by which the waistband 12 may be formed and the resulting properties of the formed waistband 12 will generally be described in relation to the waistband 12 depicted in FIG. 5. However, it is understood that the waistband 12 depicted in FIG. 5 is shown for illustrative purposes and that the waistbands 12 of the other embodiments described herein (e.g. the curved waistband 12-2 of FIG. 3B) may also be formed as described in this specification. It is also understood that the material properties and benefits that may result due to the forming of the waistband 12 as described will apply to all of the waistbands 12 in all of the embodiments included herein.

A. The Outer Piece

The outer piece 32 may be a single-ply of material (a single-ply piece), a double-ply of material (a double-ply piece), or any other number of plies or types of materials or pieces. It may be preferable that the outer piece 32 be formed into the general shape of the waistband 12 as described above (e.g. the straight waistband 12-1 and/or the curved waistband 12-2).

The fabric used to form the outer piece 32 may be any type of fabric that may be adequate to generally form a waistband 12. The fabric may also be a self-fabric that may comprise a general pant fabric, including, for example, cotton, poly-cotton, linen, denim, polyester, etc. The fabric may also be rigid material, mechanical stretch material, stretch material (e.g., elastane—Lycra or Spandex), or other types of materials. The fabric may, but need not be, the same fabric used to form the garment to which the waistband will be/is attached. A garment may use more than one self-fabric.

The outer piece 32 may be a single piece or may comprise two or more sections (pieces) that may be joined together to generally form the length of the outer piece 32. If a single piece, the outer piece 32 may be cut in any way, including, e.g., along its length, breadth, or on a bias. If sectional, the sections may each be cut in any way, including, e.g., along their length, breadth, or on a bias, and may be joined end-to-end, overlapping or in other orientations with respect to one another to form the outer piece 32. The sections may be cut in different ways with respect to one another. The sections may or may not comprise the same materials. It may be preferable that with the sections joined together, the waistband 12 may be formed into the general shape of the waistband 12 as described above (e.g. a straight waistband 12-1 and/or a curved waistband 12-2).

In the example of forming a curved waistband 12, the outer piece 32 may be formed into the desired contour of the waistband 12. The outer piece 32 may be cut, sewn or otherwise formed into the desired curvature as a single outer piece 32, or may be made up of sections that may be joined to generally form the desired contour. Each section may include a contour so that the combination of sections joined end-to-end may generally form the desired overall contour of the outer piece 32 (as well as the resulting waistband 12). Cutting smaller contoured sections that may be joined to form the overall contoured outer piece 32 may make better use of the area of the fabric and reduce waste. The multiple sections or pieces may be cut in any way (e.g., along its length, breadth, or on a bias) and may or may not be cut the same way with respect to one another.

The outer piece 32 may also be formed of straight cut sections that may be joined together end-to-end at offset angles so that the combination of straight sections at offset angles may generally form an outer piece 32 with a desired overall contour. This may be used to form a curved waistband 12. The sections may also be joined end-to-end in a straight manner to generally form a straight outer piece 32 that may be used to form a straight waistband 12. It is clear that any combination of sections, whether contoured, curved, or straight, may be used in any combination to form a straight waistband 12-1 and/or a curved waistband 12-2.

When forming the fabric used to form the outer piece 32, the fabric may be cut, knit or otherwise formed into lengths of material generally having a similar or the same desired width of the desired waistband 12 (e.g. W1 of FIG. 3A, W2 of FIG. 3B or of any other desired width of any dimensions or combination of dimensions). The lengths of the outer piece 32 may be formed into sections that may be substantially longer than L1 in FIG. 3A, or than any other desired lengths of other waistbands 12 (e.g., twenty-five times the length of an individual waistband 12). The lengths of the outer piece 32 may then be cut to size as required by production, and combined with the inner piece 34 as described below to form a waistband 12.

The outer piece 32 may also be formed in individual lengths generally equivalent to the desired length of the waistband 12.

The fabric and/or self-fabric used to form the outer piece 32 may initially be with or without stretch (e.g., a compacted woven or compacted knit material or cut on the bias). In some embodiments, the outer piece 32 may be formed by first compacting the fabric and/or self-fabric to give it stretch properties. If the outer piece 32 comprises multiple sections or pieces joined together, the sections or pieces may be compacted prior to being joined together to form the outer piece 32, or the sections and pieces may be joined together to form the outer piece 32 and then compacted, or any combination thereof. The outer piece 32 may also preferably have stretch and recovery properties in at least two or more directions thereof. The stretch and recover directions may be opposing or non-opposing directions.

B. The Inner Piece (Bandroll)

Figure 6A:
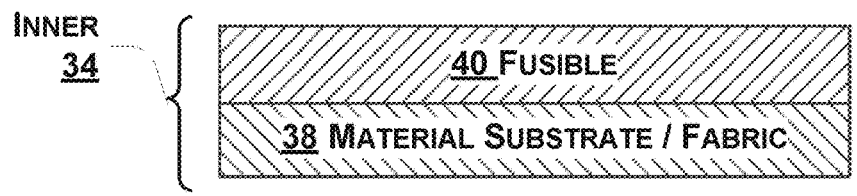

With reference to FIG. 6A, and according to exemplary embodiments hereof, the inner piece 34 (the bandroll) may comprise a composite material that may include a material substrate 38 (e.g. an underlying or inner fabric) and a fusible substrate 40 (also be referred to herein as a fusible 40). The material substrate 38 may be woven, knit, spun, or otherwise formed. The material substrate 38 and the fusible substrate 40 may be fused together to form the inner piece 34.

The material substrate 38 preferably has absorption properties. Thus, in exemplary embodiments hereof, the material substrate 38 may include fibers that may be absorbent. Absorbent fibers may include molecules (such as the sugar molecules in the cellulose of cotton, hemp, bamboo, etc.) that when in contact with moisture, may break the moisture's surface tension, allowing the moisture to move into the spaces between the fibers and into the fibers themselves. For example, cotton may absorb up to 7% of its weight in water that may be regarded in the art as substantial. In one exemplary implementation, the material substrate 38 may include absorbent fibers such as cotton, hemp, bamboo, other absorbent fibers or any combination thereof. In this way, the material substrate 38 may be an absorbent material.

In exemplary embodiments hereof, the material substrate 38 may comprise 100% cotton.

In exemplary embodiments hereof, the material substrate 38 may contain other types of fibers, such as synthetic fibers (e.g., polyester, polypropylene) or natural fibers (e.g., Merino wool). In exemplary embodiments hereof, the material substrate 38 may include a blend of cotton and polyester. In this way, the material substrate 38 may be an absorbent material and a wicking material simultaneously. That is, the polyester fiber content of the material substrate 38 may provide wicking and the cotton fiber content may provide absorption. This may result in a more comfortable waistband 12 having a bandroll 34 that may wick and absorb moisture away from the wearer's skin.

In exemplary implementations, the material substrate 38 may comprise about 65% cotton and about 35% polyester. In another implementation, the material substrate 38 may comprise about 50% cotton and about 50% polyester. Other proportions of cotton to polyester may also be used, and it is understood by a person of ordinary skill in the art that the material substrate 38 is not limited in any way by the proportions of cotton (or other absorbent fibers) to other materials (e.g., polyester) contained within the material substrate 38. It is also understood that the material substrate 38 may comprise other materials in addition to or instead of the polyester, and in similar or different proportions with respect to the cotton (or other absorbent fibers) content.

The fabric or material substrate 38 may be a single-ply of material, a double-ply of material, or any other number of plies or types of materials or pieces. In addition, the fabric or material substrate 38 may be cut in any way, including, e.g., along its length, breadth, or on a bias thereof.

The material substrate 38 preferably has stretch properties. These stretch properties may be imparted by the cut of the material substrate 38 (e.g., on a bias thereof) and/or by the fabric or material used to form the material substrate 38.

The fusible substrate 40 preferably has wicking properties. Thus, the combination of the fusible substrate 40 (with wicking properties) and a material substrate 38 (with absorption properties) results in a bandroll 34 that may wick and absorb moisture away from a wearer's skin. Wicking generally refers to the action of drawing moisture (e.g., perspiration) away from a wearer's skin, typically through the process of capillary action.

Figure 6B:
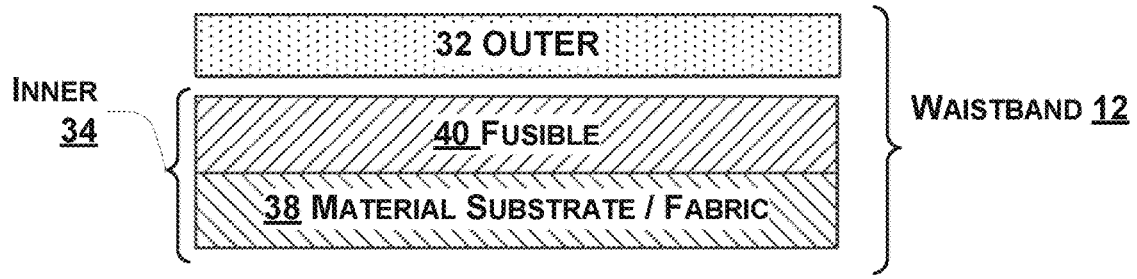

When combined with an outer piece 32 to form a waistband 12, the inner piece 34 may be positioned with the fusible side (i.e., the side of the inner on which the fusible was positioned) adjacent the outer piece 32 (per the waistband 12 in FIG. 6B), so that the material substrate 38 may be adjacent or touching the body of a wearer. That is, when used with a garment, the absorption side of the bandroll 34 is preferably against the wearer, whereas the wicking side of bandroll is adjacent the outer. In that way, moisture (e.g., perspiration) from the wearer may be absorbed by the material substrate 38 and then wicked away by the fusible 40.

Figure 6C:
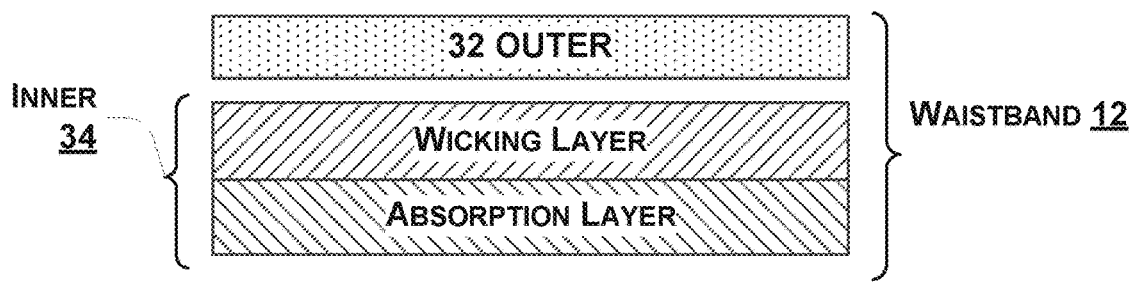

The fabric or material substrate 38 may also be referred to as an absorption layer or substrate, and the fusible substrate 40 may also be referred to as a wicking layer or substrate, e.g., as shown in FIG. 6C. Those of skill in the art will understand, upon reading this description, that the absorption layer/substrate may also have some wicking properties and the wicking layer/substrate may have some absorption properties.

The fusible substrate 40 may preferably be a two-way fusible substrate 40, although other fusible substrates 40 (e.g., one-way, four-way or n-way fusible substrates 40 where an n-way fusible substrate 40 is a fusible substrate 40 that provides stretch and recovery in n directions, and n may equal any number) may also be used and are contemplated. A two-way fusible substrate may be a fusible substrate that provides stretch and recovery in two directions thereof (preferably in non-opposing directions), typically, but not necessarily, perpendicular to each other. The directions may also be opposing directions. A two-way fusible substrate may also be referred to as a two-way stretch fusible or a two-way stretch fusible substrate. In general, an n-way fusible substrate may also be referred to as an n-way stretch fusible or an n-way stretch fusible substrate.

For the purposes of this discussion, one of the stretch (and recovery) directions may be referred to as a horizontal direction. The fused material (e.g., the bandroll or inner 34) formed by fusing the fabric 38 with a fusible substrate 40 may preferably be formed with the horizontal direction of the fusible substrate substantially along the length of the bandroll 34.

As used herein, with reference to the stretch (and/or recovery) properties of a material, a direction may refer to a single direction with respect to a particular point or location or orientation or to substantially opposing directions with respect to that particular point or location or orientation. The term "opposing directions" refers to directions that are at or about 180 degrees opposed to each other. In other words, directions that are substantially opposed to each other. Thus, e.g., with respect to a mid-point on the waistband 12, a particular fabric having horizontal stretch (and recovery) may have stretch (and recovery) to the left and right (i.e., in two opposing directions).

In some preferred embodiments, the fusible substrate 40 may be a two-way fusible substrate having greater stretch in the horizontal or length direction thereof, preferably about 90% horizontal stretch, with the other direction of stretch being about 10%. In other preferred embodiments, the two-way fusible substrate 40 may have somewhat equal stretch and recovery in the horizontal and vertical directions. The two-way fusible substrate 40 may also have other amounts of stretch and recovery in the horizontal direction compared to the vertical direction, and the scope of the embodiments described herein is not limited by the amounts of stretch and recovery that the fusible substrate 40 may have in any direction with respect to any other direction.

The material formed by fusing the fabric 38 with a fusible substrate 40 may be referred to as performance material. As used herein, a performance material is a material having stretch and recovery properties.

Perforations

In some exemplary embodiments, one or more layers of the bandroll 34 may include perforations.

Figure 7A:
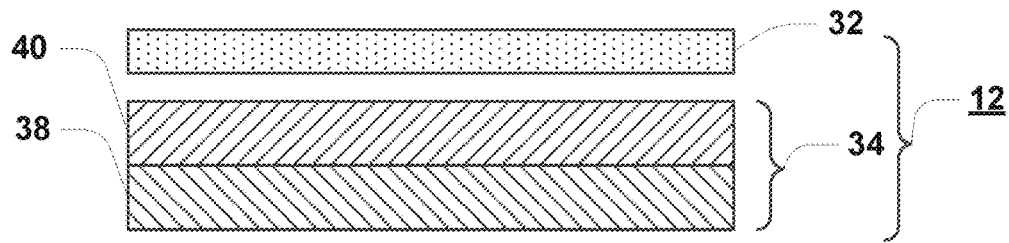

FIG. 7A shows an un-perforated inner/bandroll 34 (and waistband 12) according to exemplary embodiments hereof, with an outer fabric or outer piece 32 and a bandroll or inner 34, where the inner 34 is formed from a fabric 38 (preferably having absorption properties) combined (e.g., fused) with a fusible substrate 40 (preferably having wicking properties), e.g., as described above with respect to FIGS. 6A-6B.

Various non-limiting examples of perforations in the bandroll (or parts thereof) are shown in the drawings in FIGS. 7B-7E.

Figure 7B:
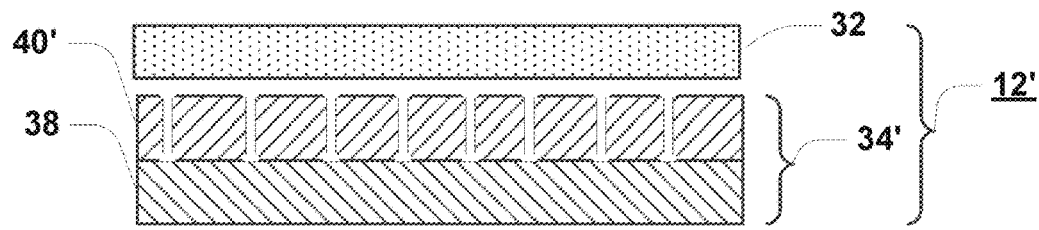

In the example bandroll 34' (and waistband 12') in FIG. 7B, the fusible substrate 40' is perforated, while the other layer (i.e., fabric 38) is not. In the drawing in FIG. 7B the vertical bars represent holes or perforations in the fusible substrate 40', passing through the fusible substrate 40'. The resulting bandroll 34' has perforations through the fusible part (i.e., through fusible substrate 40'), but not necessarily through the fabric 38.

Figure 7C:
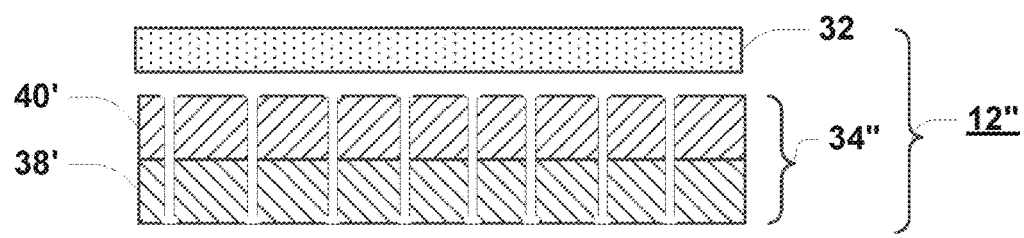

In the example in FIG. 7C, the inner piece or inner 34" (comprising fusible substrate 40' and the fabric 38') is perforated through both the fusible substrate 40' and the fabric 38'. Note that in this example, the perforations align and are preferably formed after the fusible and fabric are fused (see, e.g., FIGS. 9C-9D).

Figure 7D:
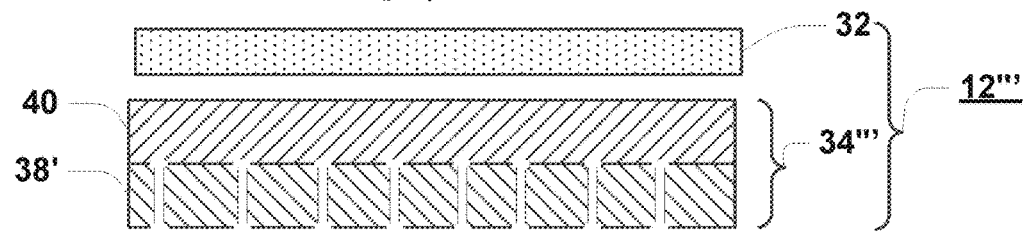

In the example inner 34''' of FIG. 7D, the fabric 38' is perforated while the fusible 40 is not.

Figure 7E:
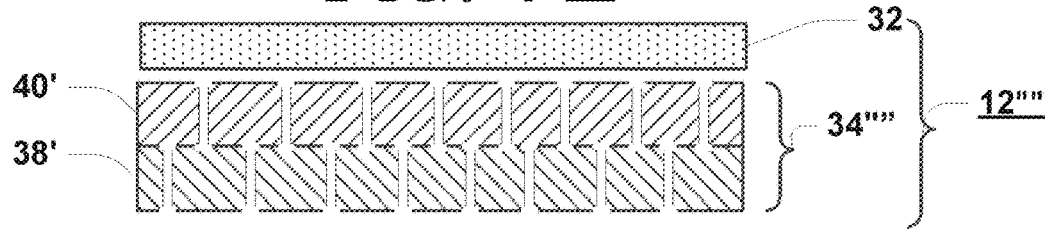

In the example inner 34'''' of FIG. 7E, both the fabric 38' and fusible substrate 40' are both perforated, but the perforations are not aligned. This may be formed, e.g., by perforating each layer (i.e., fabric 38' and fusible substrate 40') separately and before joining them.

Although not shown, the outer 32 may also be perforated, either separately or after being joined with the inner.

Perforations may be provided over the entire length and/or width of an inner piece or inner 34 or over portions and/or layers thereof (e.g., material substrate 38 and/or fusible 40). In some cases, different degrees of perforations may be provided over different portions of the waistband.

Figure 8A:
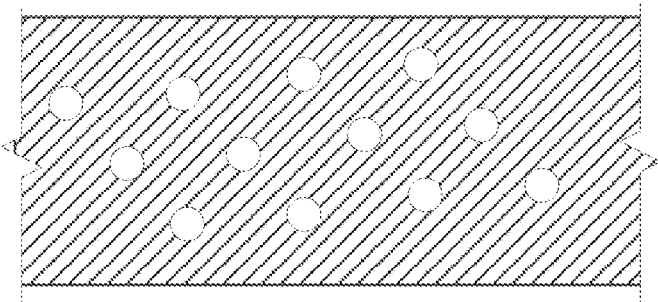
FIGS. 8A-8H show aspects of bandrolls according to exemplary embodiments hereof.
Figure 8B:
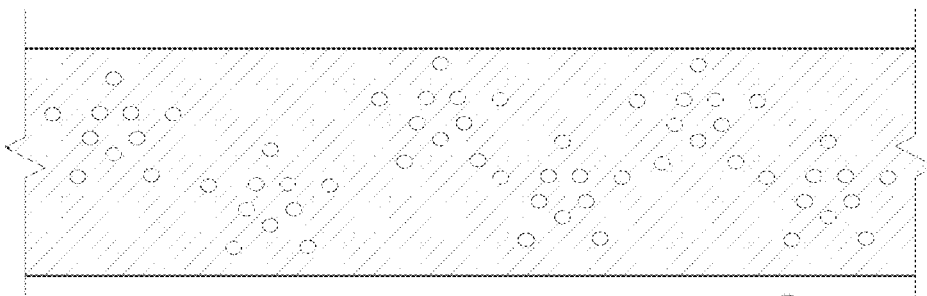

FIGS. 8A-8H show various non-limiting examples of perforations and/or perforation patterns according to exemplary embodiments hereof. For example, FIGS. 8A-8B show repeating patterns of perforations. Perforations in the bandroll or a bandroll layer may comprise patterns corresponding, e.g., to text, logos, etc., e.g., as shown in FIGS. 8A-8H. In the examples of FIGS. 8D-8H, some of the perforations may span a substantial portion of the width of the bandroll or a bandroll layer. In the example in FIG. 8F, the some of the perforations (the oval-shaped perforations) span a substantial portion of the width of the bandroll or a bandroll layer, whereas other perforations may correspond to a pattern (e.g., a logo or the like). In the example in FIG. 8H, the perforations comprise an alternating pattern of oval-shaped perforations and other perforations forming the letter "T". Perforations in the bandroll or a bandroll layer may be of any shape, size, or orientation. The perforations in a bandroll or a bandroll layer need not all be the same shape, size, or orientation. The perforations may form a repeating pattern. Perforations may be formed at specific locations in the bandroll to correspond to locations on the garment when worn. In this manner, perforations may be used to aid wicking.

Wicking may be provided over the entire length and/or width of a waistband or over portions thereof. In some cases, different degrees of wicking may be provided over different portions of the waistband.

Forming Bandrolls

The material substrate 38 and the fusible 40 may be cut, knit, woven, spun or otherwise formed into lengths of material generally having a similar or the same desired width as the bandroll 34 and/or a waistband 12 with which the bandroll is to be used (e.g. W1 of FIG. 3A, W2 of FIG. 3B). The fabric 38 and/or the fusible 40 may also be formed into other lengths.

The underlying fabric of material substrate 38 may initially be with or without stretch. In some embodiments, the bandroll 34 may be formed by first compacting the underlying fabric of material substrate 38 to give it stretch properties, and then combining the compacted underlying fabric of material substrate 38 with the fusible substrate 40 (to control and give memory to the stretch imposed by the compaction). As should be appreciated, the underlying fabric of material substrate 38 may have the capacity to extend, and that the extension and recovery may be affected by the fusible substrate 40.

In exemplary embodiments, the lengths of the fabric or material substrate 38 and the lengths of the fusible 40 may each be formed into sections that may be substantially longer than L1 in FIG. 3A (e.g. twenty-five times the length of an individual waistband 12). In this way, the resulting waistbands 12 may be produced in bulk (as a continuous stream) to be then cut into desired lengths during the manufacturing process of the pants 10.

To achieve this, the underlying material substrate 38 and/or the fusible 40 may be directly formed into the lengths desired, or may be formed in shorter sections that may be combined end-to-end (or in any other way or orientation) to form the desired lengths.

FIGS. 9A and 9B depict exemplary systems for manufacture of continuous bandrolls according to embodiments hereof. It is understood by a person of ordinary skill in the art that the systems shown and described are illustrative, and that the system may comprise more than one individual system or combinations of systems. In addition, any of the acts described may be performed by any number of systems.

The underlying material substrate 38 and the fusible substrate 40 may each be provided on spools, rolls, troughs or the like which may be positioned to feed appropriate amounts of the material substrate 38 and fusible substrate 40 into a fusing press or fuser 54, substantially tension free. The spools may be positioned such that the fusible substrate 40 is appropriately located on top (or bottom) of the underlying material substrate 38.

As shown in the exemplary system 50 in FIG. 9A, the material substrate 38 may already be compacted or it may be fed into a compactor 52 to be compacted prior to being fused with the fusible substrate 40 (by fuser 54) The amount of compaction of material substrate 38 may depend on the application, as will be described in other sections hereof.

The material substrate 38 and the fusible substrate 40 may next be fed into a fuser or fusing press 54. Before entry to the fuser 54, the fusible substrate 40 may be positioned on top of the compacted fabric 42, e.g., by aligning the center longitudinal axis of the fusible 40 with the center longitudinal axis of the underlying material substrate 38 along their respective lengths (e.g. along L1 of FIG. 3A). The fabric 38 and the fusible 40 may then be fused together to form the bandroll 34. The fusible 40 may also be positioned on the bottom of the material substrate 38 before being fed into the fusing press 54. A guide mechanism (not shown) may be positioned in front of fusing press 54 in order to position the fusible substrate 40 with the material substrate 38.

The fusing press or fuser 54 may fuse the material substrate 38 and fusible substrate 40 together under conditions (e.g., at temperature, pressure, and speed) appropriate for the materials being used. Those of ordinary skill in the art will know and understand what settings to use for the fuser 54 based on the materials being used for the underlying material substrate 38 and the fusible substrate 40. The output of the fuser 54 may be a fused combination 34 comprising the underlying compacted material substrate 38 and the fusible substrate 40 (e.g., the bandroll 34 of FIG. 7A).

After exiting the fuser 54, the fused combination (a stream of bandrolls) 34 may be cooled by passing through a cooler 56. The cooler 56 may be a dedicated cooler (e.g. a refrigeration unit) or may comprise cooling bins, cooling troughs, and/or spacing between the equipment components. The resulting stream of bandrolls 34 may be substantially longer than a single waistband (e.g. twenty-five times the length of an individual waistband 12), and may be referred to as a continuous stream of bandrolls 34. The continuous stream of bandrolls 34 may then be collected, for example, by a spooler 58, and wound onto rolls or spools 60, or may be cut to measurement.

The continuous stream of bandrolls 34 may be later cut to the desired lengths and formed with outer pieces 32 to form waistbands 12. This may allow for long lengths of bandrolls 34 to be more easily transported, stored and utilized. For example, the spooled bandrolls 34 may be provided to an entity that may manufacture garments to be used to form the inner layer of the garment waistbands 12. Accordingly, the entity may receive the spooled stream of bandrolls 34, and subsequently, as needed for production, cut the stream of bandrolls 34 into lengths as required for each garment (e.g., pair of pants or the like). The continuous stream of bandrolls 34 may also be provided in other ways that may be appropriate depending on the lengths of the continuous streams of bandrolls 34.

In other exemplary embodiments hereof as depicted in FIG. 9B, in the system 50', the compacted underlying material substrate 38 and the fusible 40 may be fused by the fuser 54 and cooled by the cooler 56 as described above. The continuous stream of bandrolls 34 may then be fed into a printer 62 such that graphics, text, logos, barcodes, QR codes, instructions, labels, and other types of images and/or indicia may be printed upon the bandrolls 34. The surface of the underlying compacted material substrate 38 and/or the surface of the fusible 40 may be printed. The output of the printer 62 may be a continuous stream of printed bandrolls 34' that may then be collected, for example, by a spooler 58 onto spools 60, or may be cut to measurement.

For purposes of this description, all references to a bandroll and/or a continuous stream of bandrolls will also refer to a printed bandroll and/or a continuous stream of printed bandrolls, respectively, and the details, information and descriptions with reference to a bandroll and/or a continuous stream of bandrolls, whether in the written specification or the figures, will also pertain to a printed bandroll and/or a continuous stream of printed bandrolls, respectively.

The material substrate 38 and/or the fusible 40 used to form the bandrolls 34 may also be formed in shorter sections that may or may not be provided on rolls. The bandrolls 34 may also comprise sections of the material substrate 38 fused with the fusible 40 that may be joined end-to-end to generally form the bandroll 34.

As discussed above, the bandroll or portions thereof may be perforated, as may the waistbands.

In cases corresponding to the perforated inner 34' of FIG. 7B, the fusible substrate is perforated, whereas the other layer (the fabric 38) is not. This may be achieved by providing a pre-perforated fusible substrate 40 in the exemplary systems 50, 50' of FIGS. 9A-9B. Alternatively, a perforator may be positioned before the fuser 54 (e.g., at location P2 in FIGS. 9A-9B) to perforate the fusible 40 prior to combining it with the material substrate 38.

Figure 8C:
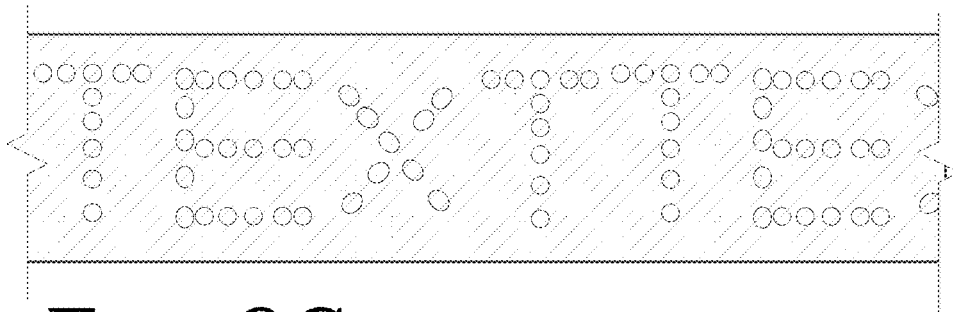
Figure 8D:
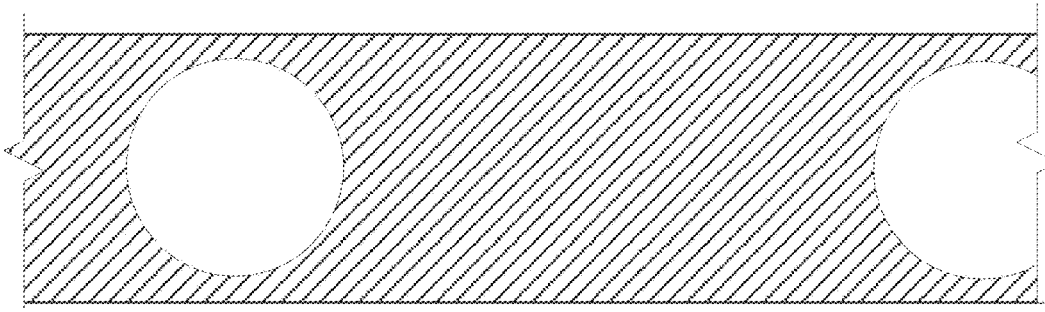
Figure 8E:
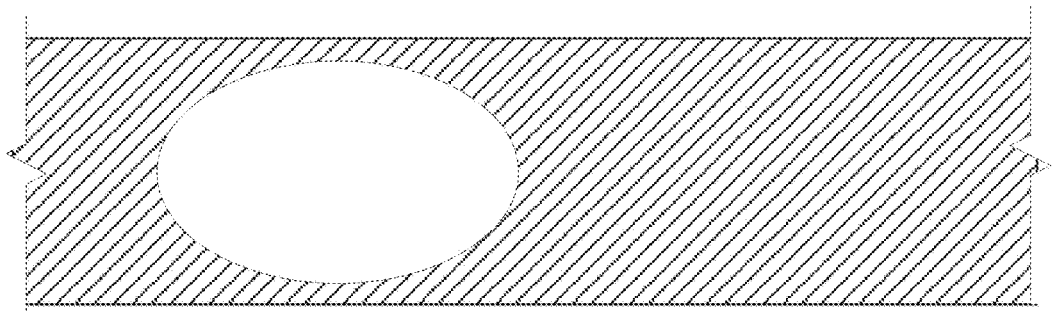
Figure 8F:
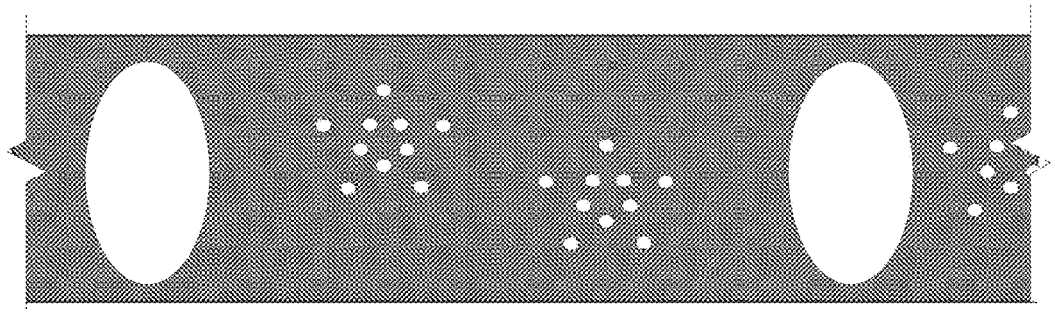
Figure 8G:
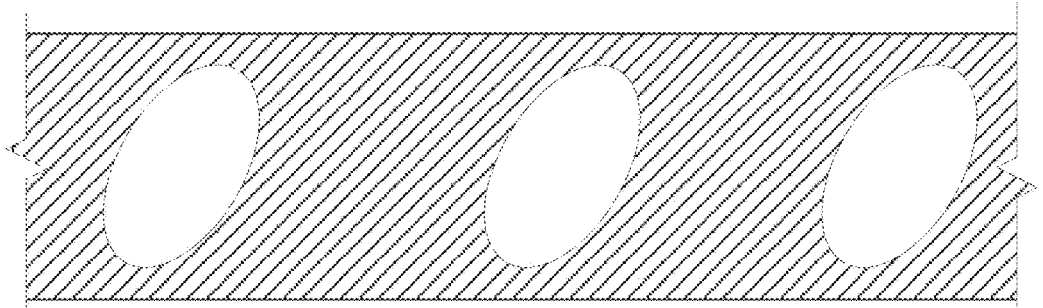
Figure 8H:
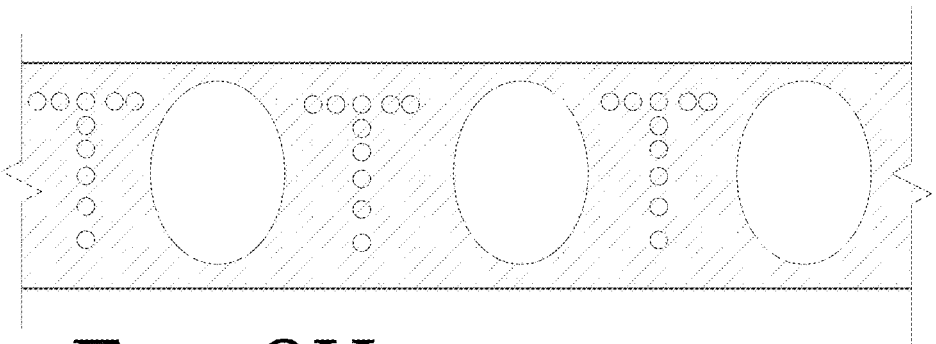

For the inner 34" of FIG. 7C, the bandroll 34" is perforated (through both the fusible substrate 40' and the material substrate 38'). This may be achieved by a system 50" or 50'" of FIGS. 9C-9D, which are similar to the exemplary systems 50, 50' of FIGS. 9A-9B, but may also include a perforator 64, preferably after the cooler 56. The perforator 64 may comprise one or more rollers or the like to perforate the bandroll 34 coming out of the cooler 56. The rollers may have any perforation pattern thereon, including perforation patterns corresponding to text, logos, etc., e.g., as shown in FIGS. 8A-8C. The output of the perforator 64 is a perforated bandroll 34" (e.g., as shown in FIG. 7C).

In the system 50' shown in FIG. 9D, a perforator 64 may be positioned before or after the printer 62, or a perforator 64 may be combined with a printer 62 to both print and perforate. In such case, the combined printer/perforator may print a pattern (e.g., indicia, a logo, text, etc.) corresponding to the perforation pattern (or vice versa).

In some cases, only the material substrate 38' is perforated (e.g., as shown in FIG. 7D). In these cases, the fabric being fed into the fuser 54 (in FIGS. 9A-9B) may be pre-perforated or a perforator may be positioned before the fuser 54 (e.g., a position P0 or P1 in FIGS. 9A-9B).

Although either (or both) of the material substrate 38 and the fusible 40 may be pre-perforated, additional perforation may be provided (e.g., individually, at location P2 for the fusible 40 and either P0 or P1 for the fabric 38).

Those of skill in the art will understand, upon reading this description, if perforations are already present in the bandroll exiting the fuser 54 (either because the fabric and/or fusible were provided pre-perforated and/or because the fabric and/or fusible were perforated prior to being fused), the system need not (but may) still perforate (using perforator 64 in FIGS. 9C-9D).

In the systems shown in FIGS. 9B and 9D, a printer 62 is positioned after the cooler 56. Instead (or in addition), with reference again to FIG. 9A, one or more printers may be positioned at position P0 (to print on the material substrate 38 before compaction by a compactor) and/or at position P1 (to print on the material substrate 38 after compaction by a compactor) and/or at position P3 (to print on the material substrate 38 after fusing by fuser 54).

Determining Compaction Amounts and Matching Fusible to Fabric

As described, the fabric 38 may be compacted (e.g., by compactor 52 in FIG. 9D). The amount of compaction exerted onto the fabric 38 may depend at least partially on the type of fusible 40 used and the amount of desired or acceptable shrinkage for the bandroll 34.

For the purposes of this specification, the term shrinkage may refer to a change in dimensions across the length and/or width of the fabric, e.g., after washing, usage and relaxing. Shrinkage may be determined as a percentage, e.g., Shrinkage percentage=(length of fabric before wash)−(length of fabric after wash))/(length of fabric after wash)×100

There are various standard test methods used to determine shrinkage. For example, AATCC (American Association of Textile Chemists and Colorists) Test Method 135, Dimensional Change of Fabrics After Home Laundering Scope: Determines the dimensional changes of garments when subjected to home laundering procedures used by consumers. Those of ordinary skill in the art will realize and appreciate, upon reading this description, that any method can be used to determine shrinkage, although the same method is preferably used for all components.

In exemplary embodiments hereof, the shrinkage of the bandroll 34 may be generally matched to the shrinkage of the fabric used for the outer 32. In this way, the bandroll 34 and the outer 32 may shrink the same or a similar amount (e.g., when laundered) and may thereby not bind, pucker or otherwise become deformed when the overall shrinkage of the waistband 12 occurs. It may be preferable that the outer 32 includes the same or similar self-fabric that may form the pants 10 such that the shrinkage of the bandroll 34, the outer 32, the resulting waistband 12 and the garment (e.g., pants 10) may all be generally matched.

The shrinkage of the bandroll 34 may be matched to the shrinkage of the outer 32 by choosing an appropriate inner fabric for the material substrate 38, an appropriate amount of compaction for the inner fabric and an appropriate fusible 40. In some embodiments, the following acts may be performed to match the shrinkage of the bandroll 34 with the shrinkage of the outer 32:

1. Determine the shrinkage of the outer fabric 32. This may also be the desired and/or acceptable shrinkage of the bandroll 34 so that the two shrinkages may match. For example, the shrinkage of the outer fabric may be 4%.
2. Choose a fusible substrate 40 with the same (or similar) amount of shrinkage as the outer fabric 32.
3. Choose an inner fabric 38 with shrinkage greater than the shrinkage of the outer fabric 32 and the fusible substrate 40. It may be preferable to choose an inner fabric 38 with shrinkage substantially greater (e.g., 2 times, 3 times, 4 times, etc.) than the shrinkage of the outer fabric 32 and the fusible substrate 40. Using the example 4% shrinkage for the outer fabric 32 in (1), it may be preferable to choose an inner fabric 38 with shrinkage of about 12%.
4. Compact the inner fabric 38 an amount equal to difference between the shrinkage of the inner fabric 38 and the shrinkage of the outer fabric 32. Using the example numbers above, this would equate to compacting the substrate 38 about 8% (the amount of 12%−4%=8%).
5. Fuse the inner compacted fabric 38 from (4) with the fusible 40 chosen in (2). Using the example numbers, this may result in a bandroll 34 with 4% shrinkage (matched to the 4% shrinkage of the outer fabric 32).

It can be seen that by choosing an inner fabric 38 with substantially greater shrinkage (e.g., 2 times, 3 times, 4 times, etc.) than the outer piece 32 (and the fusible 40), that a greater amount of compaction may be implemented into the inner fabric 38. It is also understood that the greater amount of compaction may result in a greater amount of stretch. Given this, it may be preferable to choose the fusible substrate 40 in (2) above that may also include stretch and recovery properties equal to or greater than the amount of compaction implemented into the inner fabric 38. In this way, the inner fabric 38 may stretch the full amount of the compaction and the fusible 40 may provide recovery for the full amount of the stretch.

Further examples of shrinkage vs. compaction are shown in Table 1 below.

TABLE 1

Examples of shrinkage vs. compaction

| Fabric of Outer 32 Shrinkage | Fabric 38 Shrinkage | Fusible 40 Shrinkage | Compaction of fabric 38 | Resulting Bandroll 34 Shrinkage |
|---|---|---|---|---|
| 3% | 12% | 3% | 9% | 3% |
| 5% | 12% | 5% | 7% | 5% |
| 8% | 12% | 8% | 4% | 8% |
| P % | Q % | P % | Q % – P % | P % |

It is understood by a person of ordinary skill in the art, upon reading this specification, that the examples described above are meant for illustrative purposes, and that the fabric 38 may undergo any amount of compaction as necessary to result in the desired stretch/recovery properties and the desired shrinkage percentages. It is also understood that the scope of the bandroll 34 and the waistband 12 is not limited in any way by the amount of compaction applied to the fabric 38 and/or the type of fusible 40 used. It is also understood that the acts described above may be performed in different order, that not all of the acts may need to be performed, and that additional acts not described may also be performed as required.

Properties and Benefits of the Bandrolls and the Waistbands

The resulting bandroll 34 may thereby provide one or more of the following benefits:

1. By being formed from a fabric 38 that may contain absorbent fibers (e.g., cotton, hemp, bamboo, etc.), the bandroll 34 may provide absorbent properties. Accordingly, the waistband 12 formed with the bandroll 34 may also provide absorbent properties.
2. By being formed from a fabric 38 that may contain wicking fibers (e.g., polyester, etc.), the bandroll 34 may provide wicking properties. Accordingly, the waistband 12 formed with the bandroll 34 may also provide wicking properties.
3. By being formed from a fabric 38 that may include a blend of absorbent fibers and wicking fibers, the bandroll 34 may be breathable. Accordingly, the waistband 12 formed with the bandroll 34 may also be breathable.
4. By being formed from a fabric 38 (having at least some stretch properties) fused with a fusible 40 (having stretch and recovery properties), the bandroll 34 may provide stretch and recovery properties to the waistband 12 to which it may be attached.
5. By being formed by a fabric 38 fused with a fusible 40, the bandroll 34 may have longevity. Accordingly, the waistband 12 formed with the bandroll 34 may also be durable and have longevity.

Regarding items (1), (2) and (3) above, when configured on the inside of the waistband 12 facing towards the body of the wearer, the bandroll 34 may wick and absorb moisture away from the wearer's body, thus providing a more comfortable fit.

The details of the above item (4) will be described in further detail with reference to FIGS. 10 and 11.

Figure 10:
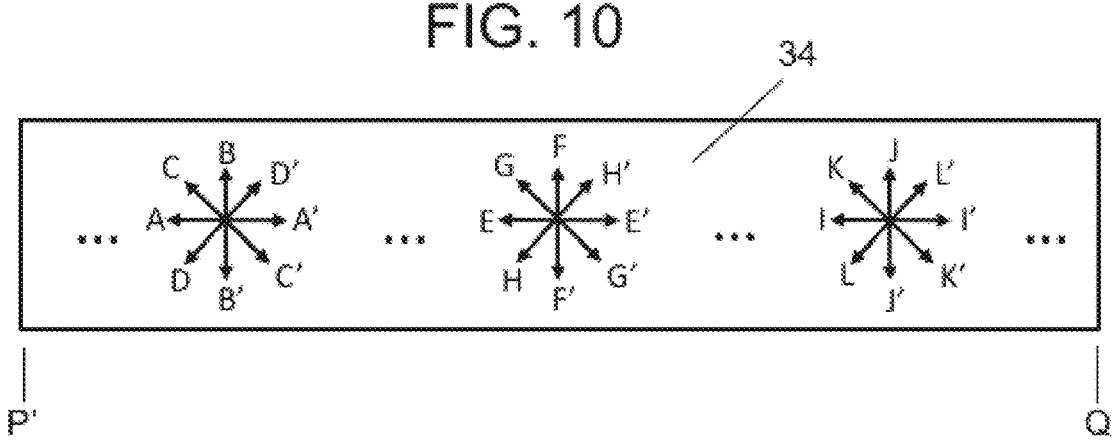
FIG. 10 shows aspects of a bandroll according to exemplary embodiments hereof.
Figure 11:
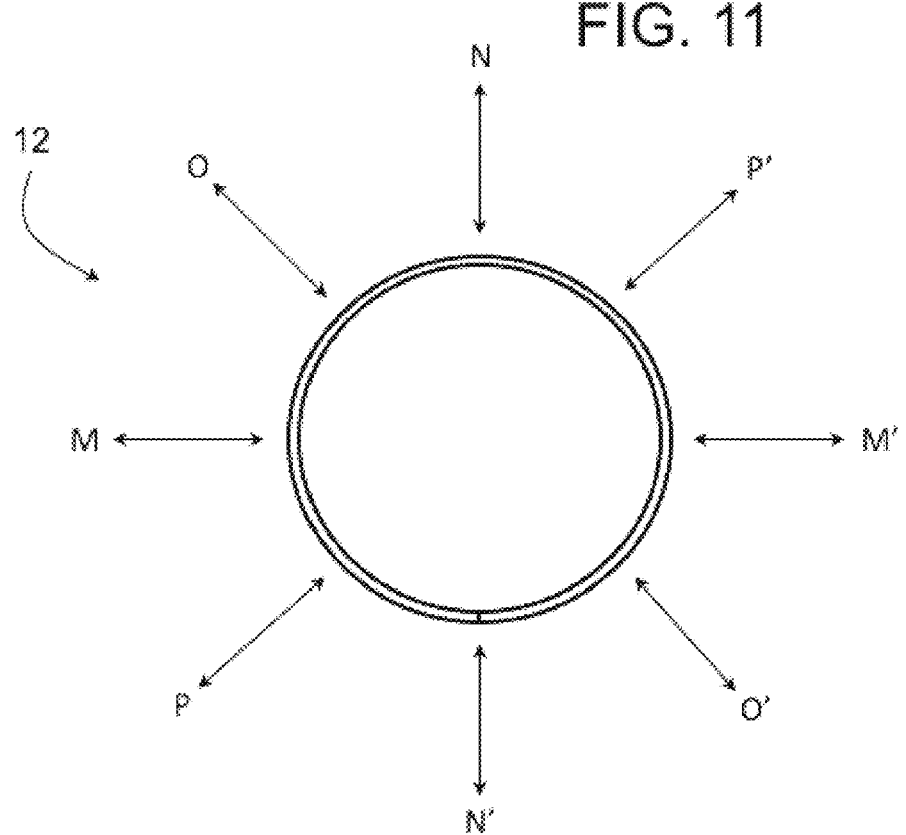
FIG. 11 shows aspects of a garment waistband incorporating a bandroll according to exemplary embodiments hereof.

As shown in FIG. 10, the bandroll 34 (e.g., the continuous stream of bandrolls 34) may preferably be formed from fabric having stretch and recovery in one, two or other numbers of directions. In exemplary embodiments, the bandroll 34 may preferably have stretch and recovery in a substantially horizontal direction (e.g., generally along the length of the bandroll 34, generally in the direction of arrowed lines A-A', E-E' and I-I' in FIG. 10, from left to right and right to left in the drawing). In other exemplary embodiments, the bandroll 34 may preferably have stretch and recovery in a substantially vertical direction (e.g., generally perpendicular to the length of the bandroll 34 (e.g. generally in the direction of arrowed lines B-B', F-F' and J-J' in FIG. 10, from up to down and down to up).

In addition (or instead), in some exemplary embodiments the bandroll 34 may include stretch and recovery in other directions that may be at different angles (offset angles) with respect to the vertical or horizontal directions (e.g., in the directions of arrowed lines C-C' and/or D-D', G-G' and/or H-H' and K-K' and/or L-L' in FIG. 10). Note that while the directions of stretch and recovery represented by the angled arrow lines C-C', D-D', G-G', H-H', K-K' and L-L' may be shown in the drawing in FIG. 10 as generally offset at approximately 45 degrees with respect to lines A-A' and B-B', E-E' and F-F', and I-I' and J-J' respectively, the directions of stretch and recovery represented by the lines C-C', D-D', G-G', H-H', K-K' and L-L' may be offset at any angles or any combinations of angles with respect to arrowed lines A-A' and B-B', E-E' and F-F', and I-I' and J-J'.

While FIG. 10 may show three constellations of arrowed lines (e.g. one constellation comprising arrowed lines A-A', B-B', C-C', D-D', one constellation comprising arrowed lines E-E', F-F', G-G' and H-H', and one constellation comprising arrowed lines I-I', J-J', K-K' and L-L') that may represent different directions of stretch and recovery of bandroll 34, it will be understood and appreciated by a person of ordinary skill in the art, upon reading this specification, that the constellations of arrowed lines shown in the figure are meant for illustrative purposes, are not to scale and do not represent any particular location of stretch and recovery along the length of the bandroll 34. Indeed, any individual point or location on the bandroll 34 may have stretch and recovery in any directions or angles thereof. Furthermore, it is understood that the constellations of arrowed lines depicted may be located at, and may thereby represent stretch and recovery at, any points or locations along the length or width of the bandroll 34. In addition, any point or location along the bandroll 34 may stretch and recover in the same, similar, or different directions and/or angles with respect to any other point or location along the length or width of the bandroll 34 or in any combination thereof. In general, it is understood that the bandroll 34 may have any direction or angle of stretch and recovery at any locations point or position, or in any combination of locations, points, and positions along its widths and lengths.

In addition, it is understood that the bandroll 34 may include stretch and recovery properties in multiple directions and in multiple locations along its lengths and widths simultaneously. For example, the bandroll 34 may simultaneously include stretch and recovery in the horizontal direction (e.g. in the direction of arrowed lines A-A', E-E' and I-I') as well as in the directions of any offset angles represented by the angled arrow lines C-C', D-D', G-G', H-H', K-K' and L-L'. Recall that while the arrowed lines C-C', D-D', G-G', H-H', K-K' and L-L' are depicted as being generally 45 degrees with respect to the arrowed lines A-A' and B-B', E-E' and F-F', and I-I' and J-J' respectively, the angled arrowed lines C-C', D-D', G-G', H-H', K-K' and L-L' may represent directions of stretch and recovery at any offset angles with respect to the arrowed lines A-A' and B-B', E-E' and F-F', and I-I' and J-J'. The bandroll 34 may include stretch and recovery properties simultaneously in multiple directions, and each direction may be at any offset angle with respect to the offset angles represented by the arrowed lines C-C', D-D', G-G', H-H', K-K' and L-L'. This example is meant for illustrative purposes and it is understood by a person of ordinary skill in the art that the bandroll 34 may include stretch and recovery properties simultaneously in any combination of angles and/or directions, and in any location or at any point on the bandroll 34.

While the bandroll 34 may have substantial stretch and recovery in the vertical and horizontal directions, the bandroll 34 may have at least some stretch and recovery in any other direction with respect to the bandroll 34. Furthermore, while preferable embodiments have primary stretch and recovery (i.e., the most stretch and recovery) in substantially the horizontal direction (i.e., along line A-A', E-E' and I-I' in FIG. 10), and/or in substantially the vertical direction (i.e., along the line B-B', F-F' and J-J' in FIG. 10), other embodiments may have primary stretch and recovery in any other directions or angles or in any combination of other directions or angles.

Those of ordinary skill in the art will appreciate and understand, upon reading this description, that the direction of a bandroll's primary stretch and recovery may also depend on the type of activities the wearer will perform when wearing the pants. For example, work pants worn as part of a uniform by a delivery driver may need primary stretch and recovery in the horizontal direction, whereas pants worn by someone bending side-to-side may need primary stretch and recovery at a non-zero angle from the horizontal (e.g., along lines D-D' and C-C', G-G' and H-H', and K-K' and L-L' in FIG. 10).

While the constellations of arrowed lines in FIG. 10 each show four generally opposing directions (A-A', B-B', C-C', D-D', and E-E', F-F', G-G, H-H', and I-I', J-J', K-K', L-L'), those of ordinary skill in the art will appreciate and understand, upon reading this description, that any directions or number of directions are possible. Furthermore, the angles between the arrowed lines in FIG. 9 are not to scale or representative of actual angles.

In some exemplary embodiments hereof, it may be preferable for the bandroll 34 to have stretch and recovery of at least 1.5 to 2.0 inches in the horizontal direction (e.g., along the length of the bandroll 34). However, lesser or greater amounts of stretch and recovery may also be used and are contemplated herein.

The bandroll 34 may be joined with the outer piece 32 with the inner (material substrate 38) facing inward (e.g. facing towards the body of the person wearing the pants 10. With the inner fabric (material substrate 38) facing towards the body when worn, the inner fabric 38 may absorb moisture (e.g., perspiration) away from the body and the fusible substrate 40 may wick moisture (e.g., perspiration) away from inner fabric 38.

The fabric used to form the outer pieces 32 and the bandrolls 34 may each be provided in rolls of substantially long lengths such that the outer piece fabric and the bandrolls 34 may be joined to forms longer lengths of waistbands 12. This may be preferable if the resultant waistbands 12 may be straight waistbands 12. This may allow for the waistbands 12 to be formed in lengths equivalent to large quantities of waistbands 12. Individual waistbands 12 may then be cut from the long lengths of waistband material to the exact specifications of each individual waistband 12. This may reduce the cost of manufacturing as well as the amount of wasted material.

The outer pieces 32 and the bandrolls 34 may also each be formed in individual lengths generally equivalent to the desired length of the waistband 12 and joined together to form the waistband 12 of the desired length. This may be preferable if the resultant waistbands 12 may be curved waistbands 12. However, it should be noted that for either straight or curved waistbands 12, the outer fabric/piece 32 and the bandrolls 34 may be provided in long lengths to be joined together to form long lengths of waistband material to be cut to length to form individual waistbands 12, or in shorter sections to be joined together to generally for individual waistbands 12.

In general, the outer piece 32 may be joined with the bandroll 34 to form the waistband 12. In this way, the waistband 12 may be formed of a composite material that may include a bandroll 34 as at least a portion of the waistband 12 (e.g. the inner layer). The waistband 12 may have the ability to stretch, and the stretch and recovery properties of the bandroll 34 may affect the waistband 12. For example, as the waistband 12 stretches, the stretch and recovery properties of the bandroll 34 may allow the waistband 12 to recover.

The waistband 12 may also be formed of the bandroll 34 without the outer piece 32. In this case, the bandroll 34 may generally form the waistband 12.

It will be clear to a person of ordinary skill in the art, upon reading this specification, that with the bandroll 34 comprising at least a portion of the waistband 12, the bandroll 34 may provide all or some of the stretch and recovery properties described above with reference to FIG. 12 to the outer piece 32 and to the overall waistband 12. It is also clear that the resulting waistband 12 may thereby include all of the stretch and recovery properties as described above relating to the bandroll 34.

The waistband 12 may be formed into a loop as described above with reference to FIGS. 2A, 2B, and 2C, and attached to the garment (e.g., pants) as shown in FIGS. 1A and 1B. FIG. 11 depicts a waistband 12 looking in the direction of arrow A1 of FIG. 1A. The waistband 12 may have expansion and contraction properties (stretch and recovery) generally outward and inward radially along its perimeter or circumference. Note that while the waistband shown in FIG. 11 may resemble the closed loop of FIG. 2C, it is appreciated and understood that the waistband 12 of FIG. 11 may represent any type of waistband, including but not limited to, an open loop (FIG. 2A), an overlapping loop with an extension (FIG. 2B) (with or without an attachment mechanism 18), a closed loop (FIG. 2C) or any other type or combinations of types of waistbands 12.

As represented by the arrowed lines in FIG. 11, the waistband 12 may expand in any or all radial directions simultaneously and subsequently contract in any or all radial directions simultaneously. It is understood that the arrowed lines M-M', N-N', O-O' and P-P' are meant for conceptual illustrative purposes and may therefore represent directions and angles of simultaneous radial expansion and subsequent contraction at any angles and locations or combinations of any angles and locations about the general perimeter or along the circumference of the waistband 12. Note that the radial expansions and subsequent contractions may be in addition to, or a result of, the stretch and recovery described above with reference to FIG. 11.

In one example, with the waistband 12 formed as described above, joined to the pants 10 (e.g. by top stitching the waistband 12 to the top seam of the pants 10), and worn, the waistband 12 may expand substantially along the direction and angle represented by the arrowed line N', as well as along offset directions and/or offset angles represented by arrowed lines P and O', when a person wearing the pants 10 may bend forward. Upon bending back up, the waistband may contract along similar axis. If the person may then bend to the left, the waistband 12 may expand substantially along the arrowed line M as well as along offset directions and/or offset angles represented by arrowed lines P and O. It will be clear to a person of ordinary skill in the art that the examples above are meant for illustrative purposes and that the waistband 12 may expand and contract in any directions and/or angles, individually or simultaneously, and that the directions and/or angles of the individual or simultaneous expansions and subsequent contractions do not limit the exemplary embodiments described herein in any way.

It is understood that the bandroll 34 that may form a portion of the waistband 12 of FIG. 11 may include all of the expansion and contraction (stretch and recovery) properties described with reference to FIG. 11. It is also understood that the bandroll 34 may provide the described expansion and contraction (stretch and recovery) properties to the waistband 12 as it forms at least a portion of the waistband 12.

A waistband with a bandroll as described herein provides numerous advantages over prior approaches. When pants 10 are worn, movements made by the user (e.g., bending over to pick up a box) may cause the waistband 12 of the pants 10 to become taut and to bind on the person wearing the pants 10. The waistband 12 described herein provides the ability of the waistband 12 to expand to better accommodate body movements, thus minimizing the tautness and binding of the garment. Having stretched or expanded, when the motion is over the waistband 12 is then able to return substantially to its original dimensions (due to the recovery properties imparted by the bandroll 34). This may provide a much higher level of comfort to persons who may wear the pants 10 configured with a waistband 12 that comprises a bandroll 34 while performing duties that may involve moving their body.

In addition, the machinery required to compact and fuse fabrics may be expensive and impractical to purchase, install, operate and maintain in each factory that may produce pants 10. Accordingly, it may be preferable to produce the bandrolls 34 offsite, at a third party location, or generally at a consolidated location that may be optimized to compact and fuse materials to form the bandrolls 34 as described above. In this way, the bandrolls 34 may be produced in large volumes with high efficiency that may reduce the overall cost of the bandrolls 34 and therefore the resulting waistbands 12 and pants 10. The outer piece 32 may be produced at the pant making facility (e.g. using the pant self-fabric). The bandrolls 34 may then be provided to the maker of the pants 10 to be joined with the outer piece 32 to form the desired waistbands 12.

It is understood that the outer piece 32 may also be produced offsite, at a third party location, or generally at a consolidated location that may be optimized to form the outer pieces 32 as described above. This location or facility may be the same location that may produce the bandrolls 34, a different location, or any combination thereof. In this case, the outer pieces 32 and the bandrolls 34 may be provided separately to the pant maker to use to form the desired waistbands 12, or may be joined together to provide the pant maker long lengths of waistbands 12 that may be cut to the desired length (e.g. provided as rolls of waistband material).

The bandrolls 34 may be produced using any colored fabric and/or fusible substrates and may also include printed, stitched, or sewn-in graphics, logos, branding, text, or other types of images or patterns. The bandrolls 34 may also be unprinted. The bandrolls 34 may also include labels such as size and fit labels, garment care instructions, and other types of labels.

Thus are described bandrolls and methods of making and using them, e.g., in waistbands and garments.

CONCLUSION

Where a process is described herein, those of ordinary skill in the art will appreciate that the process may operate without any user intervention. In other embodiments, the process includes some human intervention (e.g., an act is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of P" may include some of "P" or all of "P". In the context of a conversation, the term "portion" means some or all of the conversation.

As used herein, including in the claims, the phrase "using" means "using at least," and is not exclusive. Thus, e.g., the phrase "using P" means "using at least P." Unless specifically stated by use of the word "only", the phrase "using P" does not mean "using only P."

As used herein, including in the claims, the phrase "based on" means "based in part on" or "based, at least in part, on," and is not exclusive. Thus, e.g., the phrase "based on factor P" means "based in part on factor P" or "based, at least in part, on factor P." Unless specifically stated by use of the word "only", the phrase "based on P" does not mean "based only on P."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "P is distinct from Q" means that "P is at least partially distinct from Q," and does not mean that "P is fully distinct from Q." Thus, as used herein, including in the claims, the phrase "P is distinct from Q" means that P differs from Q in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A garment comprising a bandroll,
    wherein the bandroll comprises a material formed by an absorption layer fused with a wicking layer, the material having stretch and recovery properties, and
    wherein said wicking layer controls stretch and recovery of said absorption layer, and
    wherein the wicking layer comprises a fusible substrate, and
    wherein the absorption layer comprises a material substrate having absorptive fibers, and
    wherein a waistband of the garment comprises a second material and wherein a shrinkage of the material substrate substantially matches a shrinkage of the second material.

2. The garment of claim 1, wherein the fusible substrate comprises an n-way fusible substrate, $n \geq 2$.

3. The garment of claim 2, wherein the fusible substrate comprises a two-way fusible substrate.

4. The garment of claim 1, wherein the wicking layer comprises wicking fibers.

5. The garment of claim 4, wherein the wicking fibers comprise polyester fibers.

6. The garment of claim 1, wherein the wicking layer provides memory and/or performance to the bandroll.

7. The garment of claim 1, wherein the absorptive fibers comprise one or more of: cotton fibers, and/or hemp fibers, and/or bamboo fibers.

8. The garment of claim 1, wherein stretch properties of the absorption layer are due, at least in part, from the material substrate being compacted or being cut on a bias thereof and/or having mechanical stretch and/or comprising an elastic polyurethane fiber or fabric.

9. The garment of claim 1, wherein the absorption layer comprises a material selected from: cotton, poly-cotton, a compacted woven material, and a compacted knit material.

10. The garment of claim 9, wherein the absorption layer comprises 35% to 100% cotton and/or between 1% to 65% polyester.

11. The garment of claim 1, wherein (a) at least a portion of the absorption layer is perforated and/or (b) at least a portion of the wicking layer is perforated.

12. The garment of claim 11, wherein (i) different portions of the absorption layer have different degrees of perforation and/or (ii) different portions of the wicking layer have different degrees of perforation.

13. The garment of claim 1, wherein the bandroll is perforated.

14. The garment of claim 13, wherein different portions of the bandroll have different degrees of perforation.

15. The garment of claim 13, wherein perforations in the bandroll form and/or comprise one or more repeating patterns.

16. The garment of claim 15, wherein the repeating patterns comprise repeating logos and/or text.

17. The garment of claim 1, wherein the waistband is a straight waistband or a curved waistband.

18. The garment of claim 1, wherein the fusible substrate has shrinkage equal to shrinkage of the second material.

19. The garment of claim 1, wherein the shrinkage of the material substrate is 2% to 15%, and the shrinkage of the second material is 2% to 15%.

20. The garment of claim 1, wherein the second material comprises a fabric that is the same as a fabric of the garment.

21. The garment of claim 1, wherein the second material is selected from a group comprising: a pant fabric, cotton, poly-cotton, linen, denim, a compacted woven material, and a compacted knit material.

22. The garment of claim 1 having said waistband comprising said bandroll.

23. The garment of claim 22, wherein the waistband comprises a second material, and wherein the second material comprises an outer layer of the waistband and the bandroll comprises an inner layer of the waistband, and wherein an absorption layer of the bandroll faces away from the second material.

24. The garment of claim 22, wherein the bandroll provides memory to the waistband.

25. The garment of claim 1, wherein the garment is selected from: pants, shorts, overalls, skirts, dresses, jumpers, and one-piece suits.

26. The garment of claim 25, wherein the garment comprises a uniform.

\* \* \* \* \*